US009432877B2

(12) United States Patent
Ueda et al.

(10) Patent No.: US 9,432,877 B2
(45) Date of Patent: Aug. 30, 2016

(54) INFORMATION SHARING SYSTEM, COMMUNICATION APPARATUS, CONTROL METHOD AND COMPUTER PROGRAM

(75) Inventors: Hirofumi Ueda, Tokyo (JP); Norihito Fujita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 188 days.

(21) Appl. No.: 13/514,815

(22) PCT Filed: Dec. 7, 2010

(86) PCT No.: PCT/JP2010/071916
§ 371 (c)(1),
(2), (4) Date: Jun. 8, 2012

(87) PCT Pub. No.: WO2011/071045
PCT Pub. Date: Jun. 16, 2011

(65) Prior Publication Data
US 2012/0246275 A1    Sep. 27, 2012

(30) Foreign Application Priority Data

Dec. 9, 2009   (JP) ................................ 2009-279846

(51) Int. Cl.
| | |
|---|---|
| *H04W 28/06* | (2009.01) |
| *H04W 4/00* | (2009.01) |
| *H04W 68/00* | (2009.01) |
| *H04W 92/18* | (2009.01) |

(52) U.S. Cl.
CPC ............... *H04W 28/06* (2013.01); *H04W 4/00* (2013.01); *H04W 68/00* (2013.01); *H04W 92/18* (2013.01)

(58) Field of Classification Search
None
See application file for complete search history.

(56) References Cited

U.S. PATENT DOCUMENTS

| 6,557,111 | B1* | 4/2003 | Theimer et al. ................ 714/4.4 |
|---|---|---|---|
| 7,330,997 | B1* | 2/2008 | Odom ........................ 714/6.23 |
| 8,090,395 | B2* | 1/2012 | Ngai et al. .................... 455/513 |
| 8,090,690 | B2* | 1/2012 | Zamkoff et al. .............. 707/640 |
| 2006/0212582 | A1* | 9/2006 | Gupta .................... H04L 12/18 709/227 |
| 2006/0221891 | A1* | 10/2006 | Schmitz et al. ............... 370/328 |
| 2006/0291404 | A1* | 12/2006 | Thubert et al. ................ 370/254 |
| 2009/0274158 | A1* | 11/2009 | Sharp et al. ................... 370/400 |

(Continued)

OTHER PUBLICATIONS

Tseng, Yu-Chee, et al. "The broadcast storm problem in a mobile ad hoc network." Wireless networks 8.2-3 (2002): 153-167.*

(Continued)

*Primary Examiner* — Scott B Christensen
*Assistant Examiner* — Sean Concannon
(74) *Attorney, Agent, or Firm* — Young & Thompson

(57) ABSTRACT

An information sharing system is provided with multiple communication devices that wirelessly connect with other communication devices in order to communicate with them without going through an access point. Each communication device has: an internal deduction portion that, using a reception history of notification messages received from the other communication devices, deduces which information is currently being held by each of the other communication devices; a duplication determination portion that determines whether or not the information that is currently being held by another communication device and that was deduced by the internal deduction portion matches information held by its own host device; and an information exchange portion that, when the duplication determination portion determines that the information does not match, transmits a notification message that contains the information held by its own host communication device.

20 Claims, 17 Drawing Sheets

(56) References Cited

U.S. PATENT DOCUMENTS

| | | | |
|---|---|---|---|
| 2009/0323579 A1* | 12/2009 | Bai et al. | 370/315 |
| 2010/0003914 A1* | 1/2010 | Lee et al. | 455/3.01 |
| 2010/0195655 A1* | 8/2010 | Jacobson | H04L 45/748 370/392 |
| 2012/0054322 A1* | 3/2012 | Steiner et al. | 709/223 |

OTHER PUBLICATIONS

Androutsellis-Theotokis, Stephanos, and Diomidis Spinellis. "A survey of peer-to-peer content distribution technologies." ACM Computing Surveys (CSUR) 36.4 (2004): 335-371.*

Ding, Choon Hoong, Sarana Nutanong, and Rajkumar Buyya. "Peer-to-Peer Networks for Content Sharing." Peer-to-Peer Computing (2005): 28.*

Wu, Hao, et al. "MDDV: a mobility-centric data dissemination algorithm for vehicular networks." Proceedings of the 1st ACM international workshop on Vehicular ad hoc networks. ACM, 2004.*

Olston, Chris, and Jennifer Widom. "Best-effort cache synchronization with source cooperation." Proceedings of the 2002 ACM SIGMOD international conference on Management of data. ACM, 2002.*

Amin Vahdat and David Becker, Epidemic Routing for Partially-Connected Ad Hoc Networks, Technical Report. CS-2000-06, Duke University, Apr. 2000, 14 pages.

Mert Akdere et al., "A comparison of epidemic algorithms in wireless sensor networks", Computer Communications, vol. 29, Mar. 3, 2006, pp. 2450 to 2457.

Hirofumi Ueda, Norihito Fujita, "Epidemic-gata Joho Kyoyu ni Okeru Message Ryo Sakugen Shuho", The Institute of Electronics, Information and Communication Engineers Sogo Taikai Koen Ronbunshu, Mar. 16, 2010, p. 171.

International Search Report mailed Mar. 8, 2011 in counterpart PCT Application No. PCT/JP2010/071916.

* cited by examiner

FIG. 2

SUMMARY VECTOR 1 CONTENTS HELD BY OWN TERMINAL

| CREATION TIME | CONTENTS HELD BY TERMINAL |
|---|---|
| 10:00 | CONTENTS 1 |
| 09:00 | CONTENTS 2 |
| : | : |

~101

SUMMARY VECTOR 2 CONTENTS LIST WITHIN NETWORK

| TERMINAL ID | HELD CONTENTS |
|---|---|
| 110b | CONTENTS 1, CONTENTS 2 |
| 110c | CONTENTS 3, CONTENTS 5 |
| : | : |

~102

SUMMARY VECTOR 3 LIST OF TERMINAL POSITIONS WITHIN NETWORK

| TERMINAL ID | POSITION INFORMATION: TIME |
|---|---|
| 110b | x, y : 13:00 |
| 110c | a, b : 11:00 |
| : | : |

~103

FIG. 4A  SUMMARY VECTOR (SV) RECEPTION HISTORY

| TIME | TRANSMISSION SOURCE TERMINAL ID | CONTENTS OF RECEIVED SV |
|---|---|---|
| 13:00:00 | 110b | X |
| 13:00:20 | 110c | Y |
| : | : | : |

FIG. 4B  SUMMARY VECTOR (SV) INTERNAL DEDUCTION RESULTS

| TERMINAL ID | CURRENT SV CONTENTS |
|---|---|
| 110b | X |
| 110c | X, Y |
| : | : |

X, Y: SUMMARY OF HELD INFORMATION

FIG. 5  SUMMARY VECTOR (SV) RECEPTION HISTORY

| TIME | TRANSMISSION SOURCE TERMINAL ID | CONTENTS OF RECEIVED SV |
|---|---|---|
| 13:00:00 | 110b | X |
| 13:00:20 | 110c | X, Y |

~111

SV OF ADJACENT TERMINAL = SUM OF RECEIVED SV
= X, Y

SUMMARY VECTOR (SV) INTERNAL DEDUCTION RESULTS

| TERMINAL ID | CURRENT SV CONTENTS |
|---|---|
| 110b | X, Y |
| 110c | X, Y |

~121

X, Y: SUMMARY OF HELD INFORMATION

INFORMATION SHARING SYSTEM, COMMUNICATION APPARATUS, CONTROL METHOD AND COMPUTER PROGRAM

TECHNICAL FIELD

The present invention relates to an information sharing system, a communication device, a control method, and a computer program. In particular, the present invention relates to an information sharing system in which information is shared between communication devices which form an ad hoc network, a communication device that has a means of wirelessly connecting with another communication device in order to communicate with it without going through an access point, a control method for controlling the relevant communication devices, and a program for the relevant communication devices.

Priority is claimed on Japanese Patent Application No. 2009-279846, filed Dec. 9, 2009, the contents of which are incorporated herein by reference.

BACKGROUND ART

The widespread popularity of the Internet in recent years has been closely linked with the development of wireless communication technology and with the popularity of mobile telephones and mobile communication terminals in vehicles and the like that have a wireless communication function that enables them to connect to the Internet. Accordingly, services for sharing information contents (a generic term indicating images, music, video, text, messages and the like) that are based on an ad hoc network which forms a network without any communication infrastructure being required between multiple mobile communication terminals are showing genuine promise, and their usefulness as information transmission devices in cities or in disaster areas is anticipated.

However, because this type of ad hoc network is based on wireless communication, unlike the Internet which is formed by an interconnected wire network, the communication performance (i.e., the communication zone) is considerably limited by the environment surrounding the mobile communication terminals, and by obstacles and radio wave interference and the like. In addition, the communication topology of a formed ad hoc network is changed if the mobile communication terminals move, and route disconnections and the like occur frequently. As a result, it is not possible to hope for stable communication such as that obtainable from a wire network.

In information sharing that takes place when the communication performance (i.e., the communication zone) is limited, and in a communication environment where the communication path cannot be guaranteed, it is effective for information to be exchanged beforehand at a time when communication with other mobile communication terminals is possible. One method that has been proposed to achieve this is a method in which, when the movements of two mobile communication terminals cause them to come into mutual contact, they exchange information with each other, and synchronize the information they are holding (see, for example, Non-patent document 1).

In Non-patent document 1, the "Epidemic" method for synchronizing held information between all mobile communication terminals is proposed. The Epidemic method is characterized in that information is synchronized based on summary vectors (referred to below as 'SV') which are messages that summarize the information held by a terminal and notify other mobile communication terminals about this information.

In the Epidemic method, when a mobile communication terminal within a network detects another mobile communication terminal, they exchange summary vectors with each other, and ascertain the contents of the SV of the other mobile communication terminal. Based on the received SV, each mobile communication terminal then examines any contents that it does not itself hold, and attempts to acquire those contents. For example, as is shown in FIG. 17, a terminal T1 and a terminal T2 that have come into mutual contact as a result of moving their positions exchange SV with each other, and the terminal T2 verifies any differential contents by comparing the SV of the terminal T1 with its own SV and determining whether or not the terminal T1 has any contents that it does not itself hold. At this time, because the terminal T2 does not hold the contents B, it acquires the contents B by transmitting an acquisition request for the contents B to the terminal T1. The information held by all the terminals is synchronized as a result of all of the terminals within a network repeating this operation.

As has been described above, the Epidemic method is a method in which a comparison of the contents held by each terminal is made by means of the SV so that each terminal confirms whether there are any contents it does not itself hold, and then exchanges contents. These SV can also be used for replacing information within the network (i.e., terminal position coordinates and held contents information) with the information shown by the SV, and for verifying information existing on the network, and for transmitting requests to terminals within the network.

PRIOR ART DOCUMENTS

[Non-patent document 1] "Epidemic Routing for Partially-Connected Ad Hoc Networks", A. Vandat and D. Becker, Tech. Report CS-200006, Duke University, April 2000

DISCLOSURE OF INVENTION

However, according to the method described in Non-patent document 1, SV are transmitted extremely frequently and a problem occurs in that there is a huge increase in the bandwidth load. For example, as is shown in FIG. 18A, if each terminal holds completely different information, and also holds different SV, then when one of the terminals transmits an SV, the other mobile communication terminals detect the differences in the SV and transmit their own SV. Furthermore, each terminal again detects the differences in the SV transmitted by the other mobile communication terminals, and once again transmits their own SV. The other mobile communication terminals then transmit an SV in response to the SV that have been transmitted once again, and this operation is repeated until each terminal has transmitted its own SV numerous times. As a result of this, the bandwidth load becomes extremely heavy, and ends up obstructing other communication.

Moreover, for example, as a result of multiple terminals performing an operation together, the information held by each terminal becomes very similar, and groups of terminals having the same SV are formed (FIG. 18B). Consequently, when another mobile communication terminal which is holding different information becomes detected as a result of that terminal moving its position, all of the terminals within the group end up sending the same SV all at once to the detected terminal, so that the bandwidth load becomes extremely heavy.

As is described above, in the SV transmission control of the existing technology, because no consideration is given to the content of SV that are exchanged with other mobile communication terminals, mobile communication terminals have frequently exchanged duplicate SV. Moreover, as the density of the terminals within an environment increases, there is a likelihood that the number of SV transmissions will increase.

Here, consideration will be given again to the distribution of mobile communication terminals (i.e., people) in disaster areas and the like where it can be anticipated that an ad hoc network will be used. It is likely that rescue operations will cause mobile communication terminals (i.e., rescue workers) to congregate in large numbers in rescue sites and operate in groups, and that the density of mobile communication terminals will increase in localized areas. It is also likely that groups of mobile communication terminals that are holding similar information will appear. In cases such as this, under the existing technology, the above-described situation ends up occurring, and there is a possibility that the efficiency of the SV exchanges will deteriorate, and a further possibility that information sharing in the ad hoc network will no longer function.

The present invention has, for example, the following aspects.

A first aspect is an information sharing system in which information is shared between communication devices that form an ad hoc network, wherein there are provided multiple communication devices that wirelessly connect with other communication devices in order to communicate with them without going through an access point, and wherein each communication device has: an internal deduction section that, using a reception history of notification messages received from the other communication devices, deduces which information is currently being held by each of the other communication devices; a duplication determination section that determines whether or not the information that is currently being held by another communication device and that was deduced by the internal deduction section matches information held by its own host device; and an information exchange section that, when the duplication determination section determines that the information does not match, transmits a notification message that contains the information held by its own host communication device.

A second aspect is a communication device that wirelessly connects with other communication devices in order to communicate with them without going through an access point, and that includes: an internal deduction section that, using a reception history of notification messages received from the other communication devices, deduces which information is currently being held by a particular other communication device; a duplication determination section that determines whether or not the information that is currently being held by another communication device and that was deduced by the internal deduction section matches information held by its own host device; and an information exchange section that, when the duplication determination section determines that the information does not match, transmits a notification message that contains the information held by its own host communication device.

A third aspect is a control method for controlling a communication device that wirelessly connects with other communication devices in order to communicate with them without going through an access point, and that includes: an internal deduction stage in which, using a reception history of notification messages received from the other communication devices, a deduction is made as to which information is currently being held by a particular other communication device; a duplication determination stage in which whether or not the information that is currently being held by another communication device and that was deduced by the internal deduction section matches information held by its own host device is determined; and an information exchange stage in which, when it is determined in the duplication determination stage that the information does not match, a notification message that contains the information held by its own host communication device is transmitted.

A fourth aspect is a computer program that is stored on a computer-readable non-temporary recording medium of a communication device that wirelessly connects with other communication devices in order to communicate with them without going through an access point, and that includes: an internal deduction command that, using a reception history of notification messages received from the other communication devices, deduces which information is currently being held by a particular other communication device; a duplication determination command that determines whether or not the information that is currently being held by another communication device and that was deduced by the internal deduction section matches information held by its own host device; and an information exchange command that, when the duplication determination section determines that the information does not match, transmits a notification message that contains the information held by its own host communication device.

Note that in the above-described aspects, not all of the necessary features have been exemplified and, for example, it is also possible to form sub-combinations of these feature groups.

According to the above-described aspects, because a terminal determines whether or not transmission information is duplicated based on information held by itself and by other communication terminals, it is possible to reduce transmissions of duplicated information to other communication terminals.

BRIEF DESCRIPTION OF THE DRAWINGS

FIG. 2 is a view showing specific examples of summary vectors.

FIG. 4A is a view showing an image of a summary vector reception history and internal deduction results.

FIG. 4B is a view showing an image of a summary vector reception history and internal deduction results.

FIG. 5 is a view showing a deduction method 1 for deducing the summary vectors of another mobile communication terminal.

BEST MODE FOR CARRYING OUT THE INVENTION

Embodiments of the present invention will now be described. The following embodiments are not limiting of the invention according to the range of the claims. In addition, not all combinations of the features described in the embodiments are necessarily essential component elements.

Figure 1:
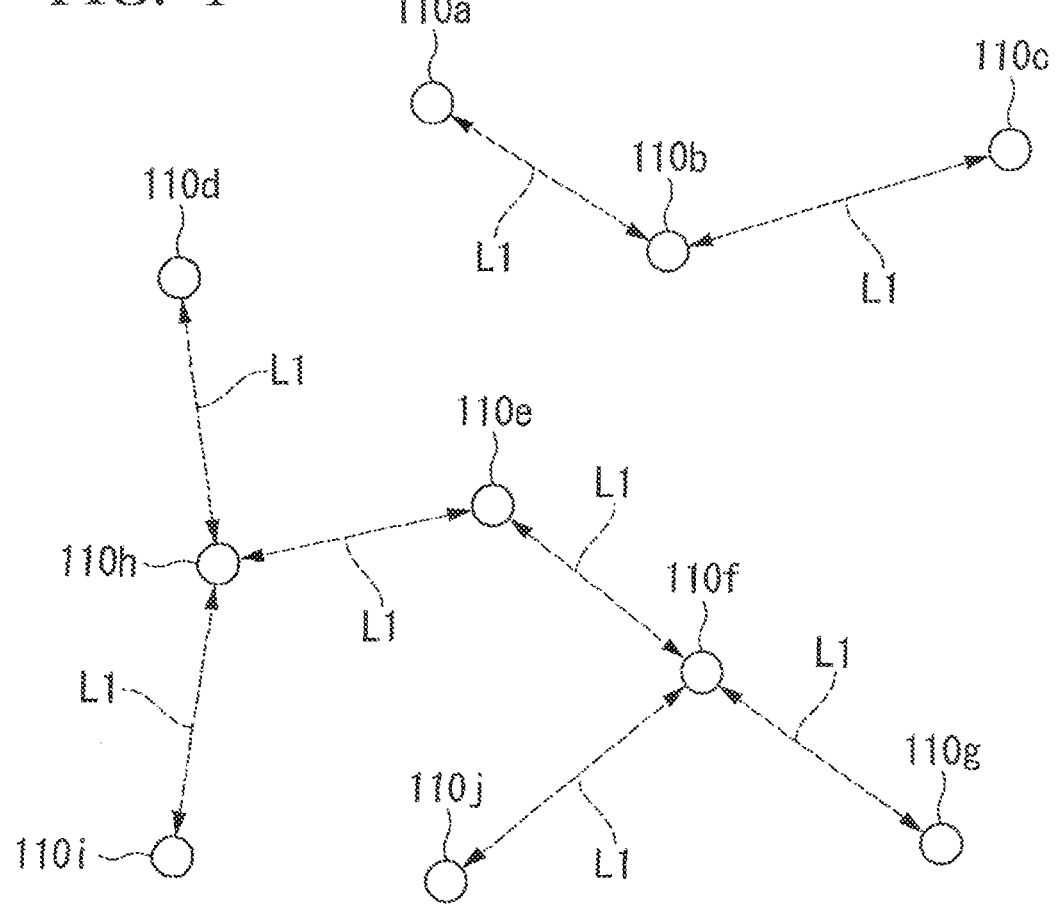
FIG. 1 is a view showing an example of an application environment of an information sharing system 100 according to an embodiment.

FIG. 1 shows an example of an application environment of an information sharing system 100 according to an embodiment. The information sharing system 100 is provided with multiple mobile communication terminals 110a, 110b, 110c, . . . (hereinafter, these will be generically referred to as mobile communication terminals 110). The information sharing system 100 is achieved as a result of a large number of the mobile communication terminals 110 congregating together, with each one being connected to the others via wireless communication L1 so as to construct an ad hoc network.

FIG. 2 shows specific examples of summary vectors. A summary vector (SV) is a message that sends notification of the information held by a mobile communication terminal 110. Moreover, summary vectors (SV) not only provide notification about the contents held by their own host terminal, but summary vector is also a generic term for the summary information of contents held by other mobile communication terminals 110 within a network, for example, information in list form that is formed from multiple elements such as data listed in hash tables and position information and the like. In addition, in the present embodiment, when an event such the following 1~4 is detected as a result of a particular host terminal exchanging SV with other mobile communication terminals 110, that host terminal transmits an SV.

1. When a new mobile communication terminal 110 is detected.
2. When the host terminal is holding information that is not held by a received SV.
3. When a received SV is holding information that is older than that held by the host terminal.
4. Periodic transmissions after regular time intervals.

The contents of an SV in the present embodiment are described as the intra-network contents information 102 shown in FIG. 2. Moreover, if, for example, the summary information of the SV held by the mobile communication terminal 110a and the summary information of the SV held by the mobile communication terminal 110b are taken as X and Y respectively, then these SV are written as SV (X) and SV (Y). Moreover, when the terminal 110a receives an SV from the terminal 110b, and the contents of the SV are updated, then in order to make it understood that the terminal 110a is holding two items of information, namely, the SV (X) of the terminal 110a and the SV (Y) of the terminal 110b, the SV of the terminal 110a are written separately as SV (X, Y).

Figure 3:
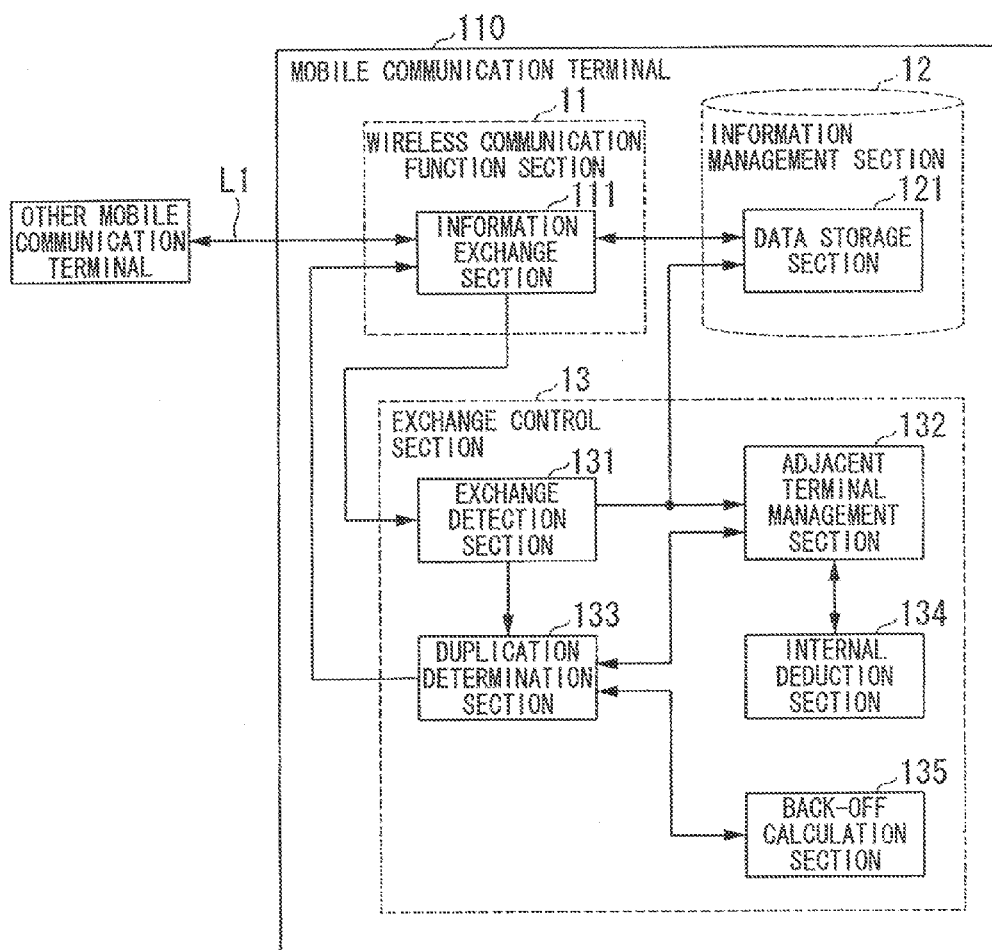
FIG. 3 is a structural view of a first embodiment.

FIG. 3 is a structural view of the first embodiment. The mobile communication terminal 110 includes a wireless communication function section 11 that performs wireless communication with other mobile communication terminals 110b, 110c, . . . , an information management section 12 that manages the information held by its own host terminal, and an exchange control section 13 that controls information exchanges.

The wireless communication function section 11 is provided with an information exchange section 111. The information exchange section 111 has the functions of receiving information (i.e., SV, contents acquisition requests and responses, contents information, and position information for other mobile communication terminals) from other mobile communication terminals via the wireless communication function section 11, and of transmitting contents information held by its own host terminal and also transmitting SV at periodic intervals. Received information is sent to a data storage section 121 of the information management section 12, and is saved in the data storage section 121. When an SV is received, it is saved in the data storage section 121 after passing through an exchange detection section 131 of the exchange control section 13.

When transmitting information, the information exchange section 111 reads from the data storage section 121 located in the information management section 12 the information that is to be transmitted, and then transmits the information. When transmitting an SV, in addition to transmitting SV at periodic intervals, when the information exchange section 111 receives a transmission notification from a duplication determination section 133 of the exchange control section 13, it reads the SV of its own host terminal from the data storage section 121, and transmits the SV.

The information management section 12 is provided with the data storage section 121. The data storage section 121 has the functions of updating, saving, and deleting contents and SV created by its own host terminal, contents acquired via the information exchange section 111, and SV received via the exchange detection section 131. When the data storage section 121 receives a new SV, it integrates the new SV with the saved SV in its own host terminal. For example, the data storage section 121 compares the received SV with the summary information within the SV of its own host terminal, and if summary information having a more recent update date is contained within the received SV, the data storage section 121 overwrites the relevant summary information within the SV of its own host terminal, while if newly obtained summary information is contained within the received SV, it updates the SV of its own host terminal with this newly obtained summary information as a new addition. When the data storage section 121 receives notification for an information transmission from the information exchange section 111, it sends the relevant information to the information exchange section 111.

The exchange control section 13 is provided with an exchange detection section 131, an adjacent terminal management section 132, the duplication determination section 133, an internal deduction section 134, and a back-off calculation section 135. When the exchange detection section 131 receives an SV from another mobile communication terminal from the information exchange section 111 of the wireless communication functions section 11, the exchange detection section 131 has the functions of comparing the received SV with the SV of its own host terminal and determining whether or not an exchange of SV is required. If it determines that an exchange of SV is required, it then has the function of notifying this determination to the duplication determination section 133. The exchange detection section 131 determines that an exchange is necessary if the host terminal of the duplication determination section 133 holds summary information which is not in the received SV, or holds summary information which has a more recent update date that that of its own host terminal. For example, if the SV of its own host terminal is holding summary information that is not in the received SV, the exchange detection section 131 determines that the SV of its own host terminal is provided with a greater quantity of intra-network summary information, and exchanges SV with the mobile communication terminal which is the source of the SV transmission. If the exchange detection section 131 detects that the summary information in the received SV is older than the summary information in the SV within its own host terminal, it determines that the SV of its own host terminal contains the newer summary information, and determines that an SV exchange is necessary in order to send notification to the mobile communication terminal which is the source of the SV transmission.

Moreover, once the determination about the SV exchange has ended, irrespective of whether or not an exchange is to be performed or not performed, the exchange detection section 131 sends the received SV to the data storage section 121 of the information management section 12, and updates the SV of its own host terminal. If the exchange detection section 131 determines that the exchange is to be performed, it also sends notification to start exchanging SV to the duplication determination section 133, and the duplication determination section 133 determines whether or not the contents of the SV transmitted by the other mobile communication terminal duplicate those transmitted by its own host terminal. Until notification announcing that the transmission is completed is received from the duplication determination section 133, the exchange detection section 131 recognizes that an SV transmission waiting period is still in force (i.e., that a back-off period is still in force), and sends subsequently received SV not only to the data storage section 121, but also to the adjacent terminal management section 132, and performs processing to save the SV reception history starting from the determination to transmit the SV of its own host terminal up until the SV is transmitted.

As is shown in FIGS. 4A and 4B, the adjacent terminal management section 132 has the functions of saving the reception histories of SV from other mobile communication terminals that arrive from the exchange detection section 131 (FIG. 4A), and of saving the internal deduction results of SV of other mobile communication terminals that are deduced by its own host terminal (FIG. 4B). For example, when an SV is newly received from the exchange detection section 131, firstly, the reception history of the SV is saved. If the received SV was received from the terminal 110b at the time 13:00:00, and the content of the summary information was [X], then as is shown in FIG. 4A, the transmitting terminal ID is recorded as being [110b], and the content of the SV received from that terminal is recorded as being [X]. Next, using the internal deduction section 134, the adjacent terminal management section 132 acquires the new internal deduction results shown in FIG. 4B from the SV reception history and the previous internal deduction results, and then saves these.

The duplication determination section 133 has the functions of determining whether or not another mobile communication terminal has transmitted an SV for contents that are duplicated in its own host terminal by the time that its own host terminal transmitted the SV, and of determining whether or not the other mobile communication terminal is storing the same summary information as its own host terminal. When it receives notification from the exchange detection section 131 to transmit an SV from its own host terminal, the duplication determination section 133 starts transmission processing to transmit an SV from its own host terminal.

Firstly, the duplication determination section 133 decides the transmission timing to transmit the SV from its own host terminal using the back-off calculation section 135. Next, at the time of the SV transmission, the duplication determination section 133 reads the internal deduction results for the SV of other mobile communication terminals from the adjacent terminal management section 132, and decides whether or not a transmission should be made based on the internal deduction result and on the SV of its own host terminal (i.e., the information possessed by its own host terminal). If the duplication determination section 133 decides that a transmission should be made, it sends notification of this to the information exchange section 111, and transmits the SV of its own host terminal.

At this time, the duplication determination section 133 makes the decision of whether or not to transmit an SV on the affirmative side if, among the SV of the other mobile communication terminals in the internal deduction results (i.e., the information possessed by the other mobile communication terminals), there is one or more SV, or a number of SV above a threshold value, of the other mobile communication terminals that does not contain all of the information of the SV of its own host terminal (i.e., information possessed by its own host terminal) which is to be transmitted. If the information of the SV of its own host terminal is contained in all of the SV in the internal deduction results, then because the other mobile communication terminals already hold the same information as that held by the host terminal, the duplication determination section 133 determines that it is not necessary to transmit the SV of its own host terminal, and discontinues the transmitting of the SV of its own host terminal. When the transmission control has ended, the duplication determination section 133 sends back an SV transmission control completion notification to the exchange detection section 131. It is also possible for the decision of whether or not to transmit an SV to be made each time an SV is received from another mobile communication terminal, and for the transmitting of the SV to be discontinued without waiting until the SV transmission timing of the host terminal.

The internal deduction section 134 has the function of internally deducing within its own host terminal which of the current SV (i.e., possessed information) may be thought to be held by other mobile communication terminals from the SV reception history saved in the adjacent terminal management section 132. When the internal deduction section 134 receives from the adjacent terminal management section 132 the reception histories for SV from the other mobile communication terminals, and the internal deduction results for the SV held by the other mobile communication terminals that were calculated previously, it deduces which SV may be thought to be currently held by the other mobile communication terminals. Several methods may be considered as the method for deducing the SV held by the other mobile communication terminals.

An example of a deduction method is shown in FIG. 5. Because the sum total (X, Y) of the contents of the SV received in the SV reception history 111 corresponds to the information that was transmitted within the communication range of its own host terminal, it is assumed that all of the other mobile communication terminals located within the communication range of the host terminal are also holding the same information, and the deduction is simple as is shown in the internal deduction results 121 shown in FIG. 5.

A method in which the SV is deduced based on common portions of the SV of the mobile communication terminals 110 located in the SV reception history may also be considered. An SV is received from another mobile communication terminal, and the saving of the SV reception history is started. For example, as is shown in the SV reception history 112 shown in FIG. 6, the reception history up until the time when the SV of the other mobile communication terminals was deduced is then taken as being, firstly, that an SV (X) has been received from the mobile communication terminal 110b, and, next, that an information SV (X,Y) has been received from the mobile communication terminal 110c.

At this time, the summary information [X] transmitted by the mobile communication terminal 110b is contained in the SV received from the mobile communication terminal 110c, and it can be understood that there are common portions to both the summary information in the SV of the mobile communication terminal 110b and the summary information in the SV of the mobile communication terminal 110c. As a consequence, it can be thought that the mobile communication terminal 110c which has common portions with the mobile communication terminal 110b transmitted an SV after first receiving the SV transmitted by the mobile communication terminal 110b. From this, a method may be considered in which it is determined that, in the same way, the mobile communication terminal 110b has received the SV (X, Y) transmitted by the mobile communication terminal 110c, and as is shown by the internal deduction results 122 in FIG. 6, the SV of the mobile communication terminal 110b is deduced to be SV (X, Y).

Figure 7:
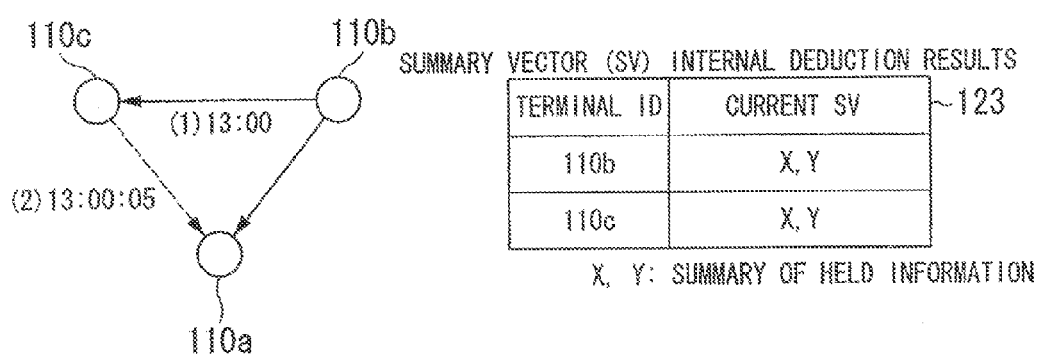
FIG. 7 is a view showing a deduction method 3 for deducing the summary vectors of another mobile communication terminal.

Furthermore, a method may also be considered in which, if an SV reception history up until the internal deduction calculation which includes the periodic SV transmissions and receptions has been saved in the data storage section 121, then a deduction may be made based on any changes from the past history. For example, as is shown in the reception history 113 in FIG. 7, the SV (Y) is received from the mobile communication terminal 110c as a result of the initial receiving of a periodic SV. Thereafter, the mobile communication terminal 110b transmits the SV (X), and the mobile communication terminal 110c subsequently transmits the SV (X, Y). At this time, it is understood that the SV of the mobile communication terminal 110c changes from [X] before the transmission by the mobile communication terminal 110b to [X, Y] after the transmission by the mobile communication terminal 110b. In addition to this change in the SV, the fact that the mobile communication terminal 110c has transmitted an SV after the mobile communication terminal 110b indicates that the mobile communication terminal 110c has already received the SV from the mobile communication terminal 110b and detected any differences therein, and has only then transmitted its own SV. From this, a method can be considered in which it is determined that the mobile communication terminal 110b and the mobile communication terminal 110c are located in positions where they are able to communicate with each other, and that the mobile communication terminal 110b is also receiving the SV (X, Y) transmitted by the mobile communication terminal 110c, and in which, as is shown in the internal deduction results 123 in FIG. 7, the SV of the mobile communication terminal 110b can be deduced to be the SV (X, Y).

In the above-described method, if the [X] of the summary information is updated to [X'], then it is not treated as the same information, but is treated as separate information. For example, using an example in which the prediction method which is based on common portions is employed, firstly, the SV (X, Y) is received from the mobile communication terminal 110b, and the SV (X', Y) is then received from the mobile communication terminal 110c. At this time, the items of summary information [X] that have mutually different creation times are treated as being different from each other, and the summary information [Y] is recognized as being a common portion. The mobile communication terminal 110b and the mobile communication terminal 110c are determined to be within a range where they can communicate with each other, and it is deduced that the mobile communication terminal 110b and the mobile communication terminal 110c both possess the SV (X', Y).

As has been described above, the internal deduction results for the SV of other mobile communication terminals that were calculated by the internal deduction section 134 are sent back to the adjacent terminal management section 132, and the internal deduction results for the SV of the other mobile communication terminals that are being saved in the adjacent terminal management section 132 are updated.

The back-off calculation section 135 has the function of deciding the transmission timings of the SV of its own host terminal. When the back-off calculation section 135 receives a notification from the duplication determination section 133 to start calculating a back-off period, it randomly calculates a transmission wait time (Formula (1)). In the calculation of the transmission wait time, position information for the terminals is exchanged in the information exchange section 111, and if position information can be used from the data storage section 121, the positional relationship between terminals and their movement speed may be read from the data storage section 121, and used for the calculation (Formula (2)). After the movement speed has been calculated from the position information, if the SV are to be transmitted with priority given in sequence to the terminals having the fastest movement speed, it is possible to then set a large correction coefficient α, or to set a small reference value for deciding the increase or decrease in the random numerical values.

Figure 6:
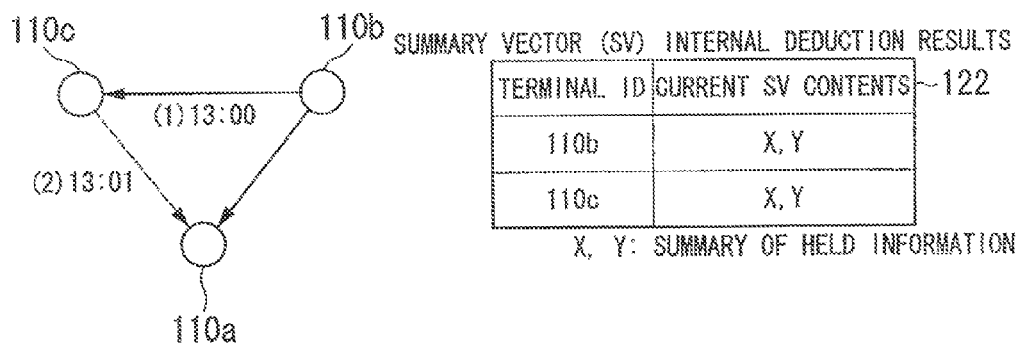
FIG. 6 is a view showing a deduction method 2 for deducing the summary vectors of another mobile communication terminal.
Figure 8:
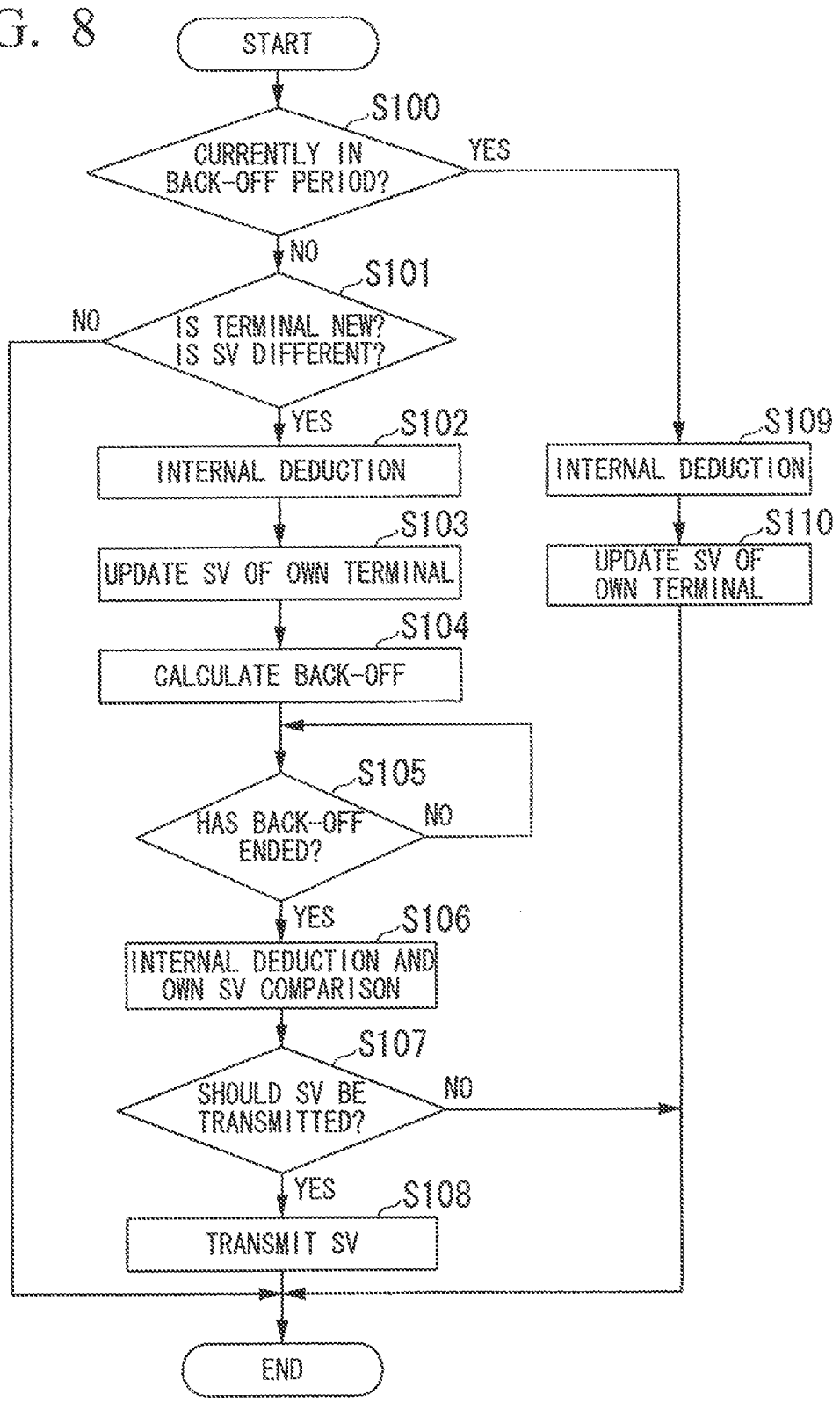
FIG. 8 is a view showing an operational flowchart of the first embodiment.

[Formula 1]

$$\text{back-off period} = \text{random numerical value} * \text{slot} \quad (1)$$

$$= \text{random numerical value} * \quad (2)$$

$$(1 - \alpha * v/V) * \text{slot}$$

slot: transmission interval,
α: correction coefficient,
V: reference value,
v: velocity FIG. 8 shows an operational flowchart of the first embodiment. Hereinafter, SV transmission control that is based on information held between mobile communication terminals 110 in the present embodiment will be explained in detail. As the method that is used to deduce the SV of another mobile communication terminal, a method that is based on common portions with the SV of the terminals in the SV reception history shown in FIG. 6 is employed.

Figure 9:
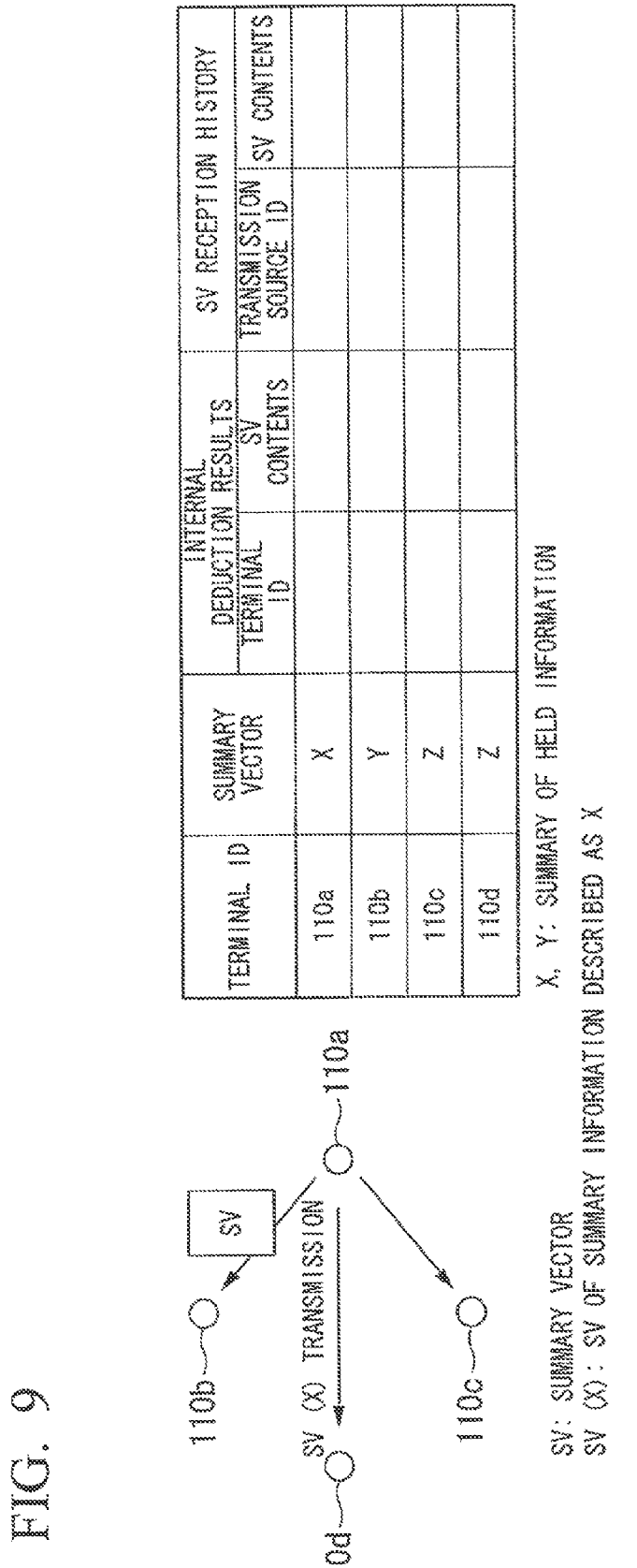
FIG. 9 is a view showing an actual operating example 1.

The mobile communication terminals 110a to 110d shown in FIG. 9 form an ad hoc network in which communication is possible between each terminal and all of the other terminals. As is shown in FIG. 9, the mobile communication terminals 110a to 110d respectively hold SV for the summary information X, Y, Z, Z. At this time, each of the mobile communication terminals 110 starts exchanging SV with the other mobile communication terminals in order to ascertain information over the network.

Firstly, each mobile communication terminal 110 monitors differences in the SV between the mobile communication terminals 110 by transmitting its own SV at periodic intervals in broadcast mode to the other mobile communication terminals 110. At this time, when an SV is received from another mobile communication terminal 110, a determination is made by the exchange detection section 131 of the exchange control section 13 as to whether or not its own host terminal needs to transmit an SV (FIG. 8: steps S100, S101). The SV is then sent to the data storage section 121 and the SV of its own host terminal is updated.

In the exchange detection section 131, firstly, a determination is made as to whether or not its own host terminal has already received another SV, and whether SV transmission control notification has been sent to the duplication detection section 133, and whether or not it is currently in a back-off period and awaiting a completion notification response (FIG. 8: step S100).

If it is not currently in a back-off period, the exchange detection section 131 confirms any differences in the summary information between the received SV and the SV of its own host terminal, and if there are none in the received SV, or if its own host terminal holds new summary information, or if a new terminal is detected, the exchange detection section 131 starts transmission processing for the SV of its own host terminal (FIG. 8: steps starting from step S102).

Next, the actual flow from the situation shown in FIG. 9 until the completion of the exchange of SV between the mobile communication terminals 110a to 110d will be explained using FIG. 8 to FIG. 14.

Firstly, the mobile communication terminal 110a transmits an SV (X) as a periodic SV transmission in order to give notification of its own SV to the other mobile terminals 110b to 110d. The mobile communication terminals 110b to 110d that have received the SV (X) from the mobile communication terminal 110a start processing in their exchange detection sections 131, based on the contents of the received SV, to determine whether or not they need to transmit their own SV (FIG. 8: steps S100, S101).

In step S100, because the exchange detection sections 131 of the mobile communication terminals 110b to 110d are not currently sending notification for SV transmission control to the duplication detection sections 133, and are not in a back-off period awaiting a completion notification response, in step S100 in FIG. 8, it is determined that they are not in a back-off period and the routine moves to step S101.

In step S101, any difference between the SV of their own host terminal and the received SV is confirmed, and the exchange detection sections 131 determine whether or not it is necessary to transmit the SV of their own host terminal. As is shown in the table in FIG. 9, if a difference is confirmed when they compare the SV of their own host terminal with the received SV (X), the exchange detection sections 131 establish that there is summary information that is not in the SV (X) of the mobile communication terminal 110a, for example, the summary information Y in the case of the mobile communication terminal 110b, and the summary information Z in the case of the mobile communication terminals 110c and 110d, and establish that their own host terminals are holding summary information that should be notified to the mobile communication terminal 110a.

As a result, the exchange detection sections 131 of the respective mobile communication terminals 110b to 110d determine that the SV of their own host terminals do need to be transmitted, and send notification to the duplication determination sections 133 telling them to perform SV transmission control for their own host terminals. Consequently, each of the mobile communication terminals 110b to 110d begins the SV transmission processing which starts from step S102 shown in FIG. 8.

Figure 10:
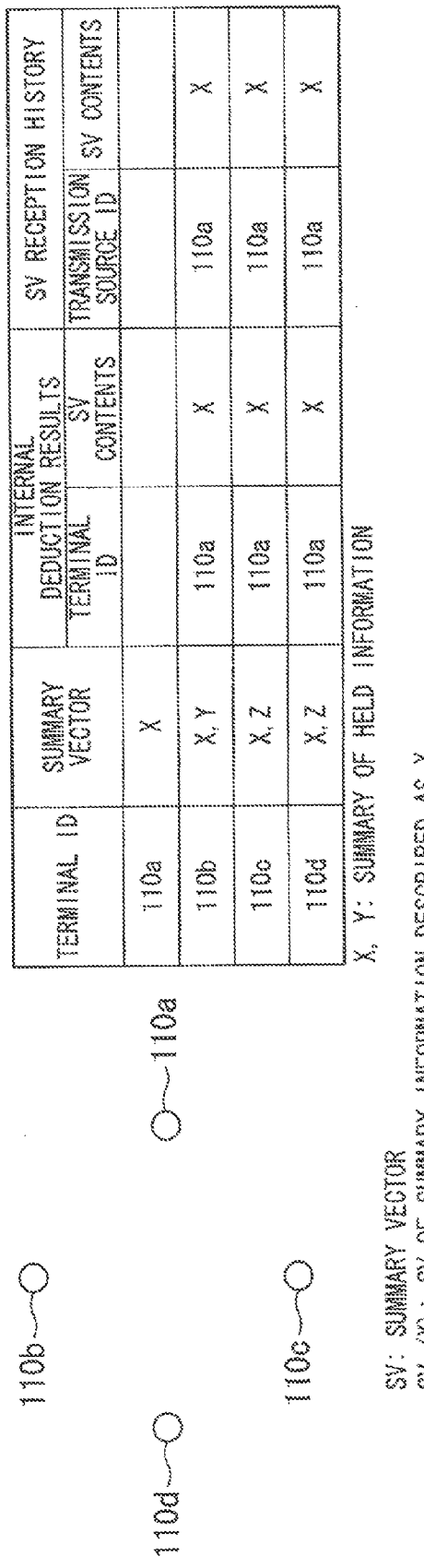
FIG. 10 is a view showing an actual operating example 2.

Here, up until the exchange detection sections 131 that sent the notification to the duplication determination sections 133 telling them to perform SV transmission control receive a response from the duplication determination sections 133 stating that the SV transmission processing of their own host terminals has been completed, they not only send SV received thereafter to the data storage section 121 and update the SV of their own host terminals, but they also send the SV to the adjacent terminal management section 132 and save a temporary SV reception history (FIG. 10).

Firstly, when the adjacent terminal management sections 132 receive an SV from the exchange detection section 131 that had determined that transmission of that SV was necessary, the processing of step S102 in FIG. 8 is started.

In step S102, the adjacent terminal management sections 132 record the ID of the transmission source terminal (110a) and the content of the received SV (X), and, as in the SV reception history shown in FIG. 10, save the SV received from their exchange detection sections 132 as a reception history. Thereafter, the internal deduction results (FIG. 10) are calculated using the internal deduction sections 134 (FIG. 8: step S102). The internal deduction results are obtained by the terminals themselves deducing the current SV of the other mobile communication terminals.

In the processing of step S102 in FIG. 8, in the initial calculation of the internal deduction results, other than the contents of the received SV and the transmission source terminal thereof, each terminal does not hold information about the other mobile communication terminals 110 or the SV information of those terminals. Because of this, the received SV information (i.e., the transmission source terminal ID and the contents of the SV) are recorded as they are as internal deduction results, as is shown in FIG. 10. After the initial time, the adjacent terminal management sections 132 update and record the internal deduction results using the internal deduction section 134 each time an SV is received from the exchange detection section 131.

Meanwhile, when the data storage sections 121 receive the SV from the exchange detection sections 131, they start the processing of step S103 in FIG. 8.

In step S103, the data storage sections 121 verify any discrepancies between the update times of the summary information in the SV of their own host terminals and of the summary information in the received SV, and whether or not there are differences between the two information contents, and also update the summary information within the SV of their own host terminals, as is shown in FIG. 10. Because this time they have received the summary information X which is not held by their own host terminals, the mobile communication terminals 110b to 110d add the summary information X to the SV of their own host terminals, and the mobile communication terminal 110b updates its SV to the SV (X, Y), while the mobile communication terminals 110c and 110d update their SV to the SV (X, Z) (FIG. 8: step S103).

Next, when the duplication determination sections 133 of the mobile communication terminals 110b to 110d receive notification from the exchange detection sections 131 instructing them to perform SV transmission control, they begin the processing starting from step S104 in FIG. 8 in order for the SV of their own host terminals to be transmitted.

In step S104, in order to decide the timings of the SV transmissions of their own host terminals, the duplication determination sections 133 decide the times for transmitting the SV using their back-off calculation sections 135 (FIG. 8: step S104). Thereafter, the routine moves to step S105.

This transmission times may be decided using random delay times (Formula (1)) or by using a calculation (Formula (2)) that is based on the terminal movement speed. If the transmission time is calculated based on the terminal movement speed, then thought may be given to hastening the transmission time for terminals having a fast movement speed so that their SV can be transmitted before they end up moving out of the communication range.

Next, during the back-off period up until the SV transmission timing shown in step S105, if the mobile communication terminals 110b to 110d receive another new SV, the exchange detection section 131 of each terminal determines that their own host terminal is currently in a back-off period via the processing of step S100 in FIG. 8. As a result, when an SV is newly received, the processing of step S109 and step S110 in FIG. 8 is executed, and until the current SV transmission processing is ended, the SV of their own host terminals are no longer transmitted even if a new SV is received.

Figure 11:
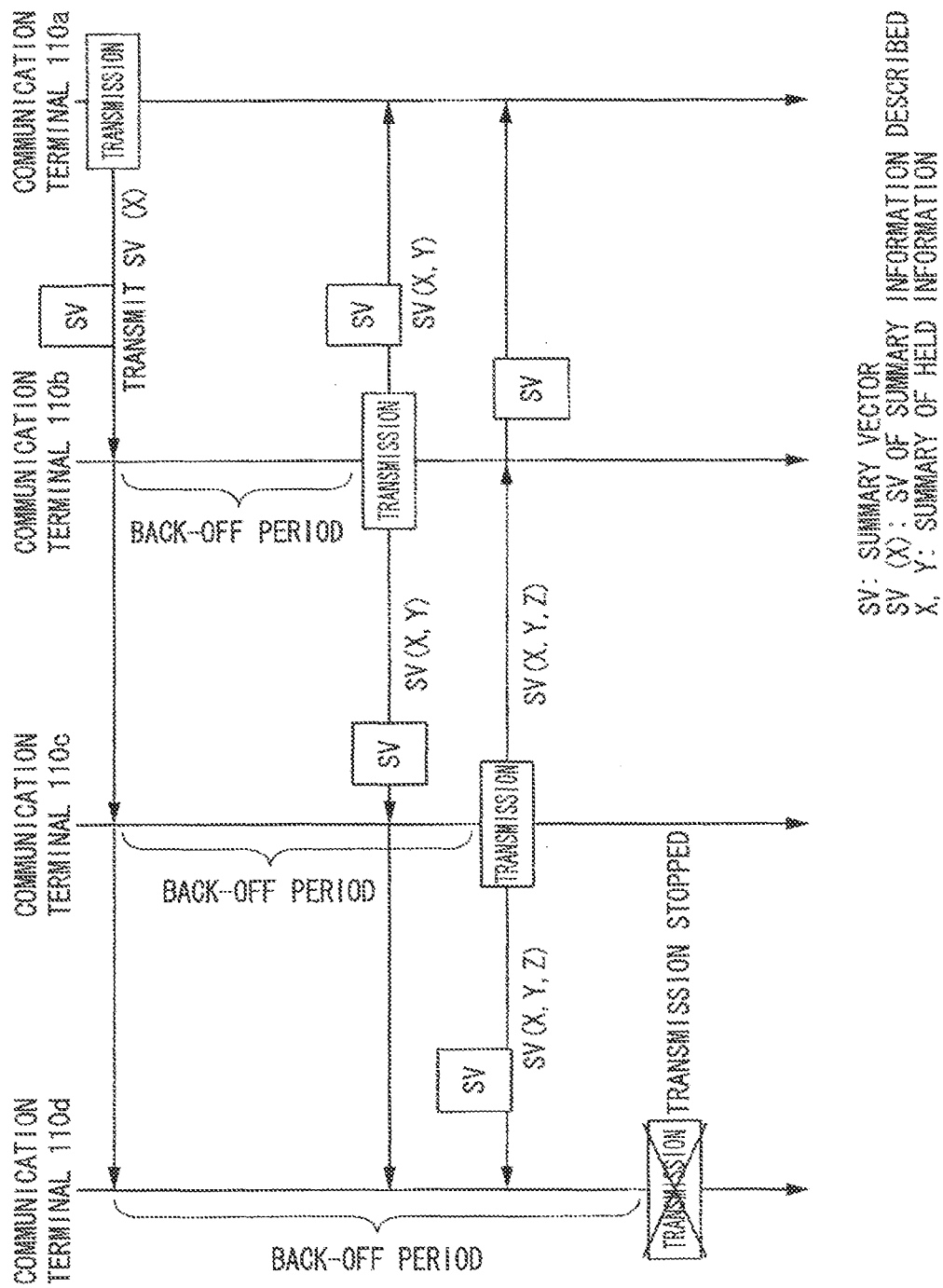
FIG. 11 is a sequence diagram showing back-off calculation results.

The transmission timings of each terminal that were set at this time as well as the subsequent SV transmission sequences are shown in FIG. 11, and the SV transmission sequence, which is based on the back-off period decisions, are in the sequence of the mobile communication terminal 110b, then the mobile communication terminal 110c, and then the mobile communication terminal 110d.

Figure 12:
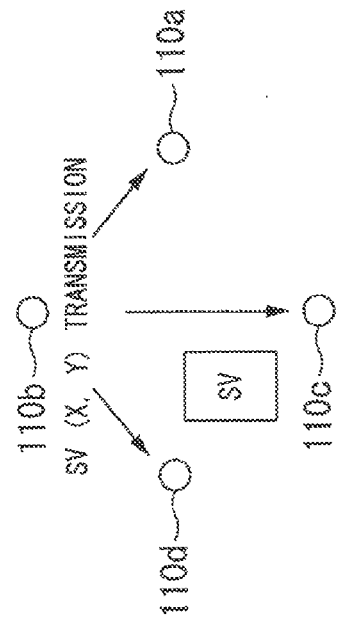
FIG. 12 is a view showing an actual operating example 3.

After the mobile communication terminal 110a has transmitted an SV, as is described above, the mobile communication terminals 110b through 110d enter a back-off period in order for their own SV transmissions to be performed (FIG. 8: step S105). Next, as is shown in FIG. 11, the mobile transmission terminal 110b, which has the earliest transmission timing from among the mobile transmission terminals 110b through 110d, finishes the processing of step S105 in FIG. 8, and starts the processing of step S106 (FIG. 12).

In step S106, at the moment when the SV transmission timing arrives, the duplication determination section 133 of the mobile communication terminal 110b reads the internal deduction results from the adjacent terminal management section 132, and compares the deduced SV of the other mobile communication terminals with the SV of its own host terminal, and verifies whether or not there are any differences in the summary information that need to be transmitted to the other mobile communication terminals (FIG. 8: step S106).

As a result of this, the mobile communication terminal 110b is able to ascertain that it is holding summary information [Y] in its own SV (X, Y) that is not in the deduced SV (X) of the mobile communication terminal 110a. Accordingly, the mobile communication terminal 110b determines that its own SV contains a greater quantity of summary information compared to the mobile communication terminal 110a, and decides to transmit its own SV (X, Y) in order to provide notification of this to the mobile communication terminal 110a (FIG. 8: step S107).

Next, the duplication determination section 133 sends an SV transmission notification to the information exchange section 111. As a result, the SV of the mobile communication terminal 110b is transmitted (FIG. 8: step S108), and the SV transmission processing of the mobile communication terminal 110b is ended.

At this time, the duplication determination section 133 notifies the exchange detection section 131 that the SV transmission has been completed, and cancels the back-off period that was initially set, and also stops subsequent transfers of the SV to the adjacent terminal management section 132 and stops the internal deduction calculations.

Next, because the mobile communication terminal 110a, the mobile communication terminal 110c, and the mobile communication terminal 110d that received the SV from the mobile communication terminal 110b have received a new SV from another mobile communication terminal, a determination is started in the exchange detection section 131 of each of these terminals as to whether or not it is necessary for them to transmit an SV (FIG. 8: steps S100 and S101).

The mobile communication terminal 110a, firstly, verifies in its exchange detection section 131 whether or not it is currently in a back-off period (FIG. 8: step S100), and because currently no back-off period is provided, it determines that it is not in a back-off period, and the routine moves to the next step S101.

In step S101, the exchange detection section 131 verifies any differences between the SV of its own host terminal and the received SV, and determines whether or not it is necessary to transmit the SV of its own host terminal. In step S101, although there is a difference between the received SV (X, Y) and the SV of its own host terminal (X), because its own host terminal is not holding any summary information which is not in the received SV, the exchange detection section 131 of the mobile communication terminal 110a determines that it is not necessary for it to transmit an SV, and the processing performed by the exchange detection section 131 is ended. The received SV is then sent to the data storage section 121 of the information management section 12, and the SV of the mobile communication terminal 110a is updated. As is shown in FIG. 12, because the new summary information Y has been received, the SV is now (X, Y).

The mobile communication terminal 110c and the mobile communication terminal 100d, firstly, verify in their exchange detection sections 131 whether or not they are currently in a back-off period (FIG. 8: step S100). Because they have sent notification for SV transmission control to the duplication determination sections 133, but the exchange detection sections 131 have not yet received a response indicating that this has ended, they determine that they are currently in a back-off period, and the routine moves to step S109 in FIG. 8.

In step S109, the exchange detection sections 131 send the received SV to their data storage section 121 and adjacent terminal management section 132, and in the same way as when they received the SV from the mobile communication terminal 110a, the adjacent terminal management sections 132 update their SV reception history, and then, as is shown in FIG. 12, update the internal deduction results for the SV of the other mobile communication terminals using their internal deduction section 134 (FIG. 8: step S109). The routine then moves to step S110, and because the new summary information Y was received, the SV of their own host terminals are updated in the manner shown in FIG. 12.

Here, in the calculations of the second and subsequent internal deductions (FIG. 8: step S109), the internal deduction section 134 performs these using the SV reception histories from the other mobile communication terminals that are recorded in the adjacent terminal management section 132.

As is shown in FIG. 12, hitherto, the mobile communication terminal 110c and the mobile communication terminal 110d have firstly received the SV (X) from the mobile communication terminal 110a, and thereafter received the SV (X, Y) from the mobile communication terminal 110b. As a result, the reception histories from the mobile communication terminal 110a and the mobile communication terminal 110b are recorded in the reception histories saved by the adjacent terminal management section 132.

At this time, the mobile communication terminal 110c and the mobile communication terminal 110d regard the summary information in the SV in the reception histories as one element, and when the intersections (SV (X) ∩ SV (X, Y)) are calculated, then it can be seen that the summary information X exists as summary information that is common to the two SV histories. Aside from the periodic SV transmission, the SV transmissions take place when summary information that is not held by the other mobile communication terminals is held by these terminals. Namely, after it has been determined that the mobile communication terminal 110a and the mobile communication terminal 110b are both holding summary information that is not held by another mobile communication terminal, the summary information held by these is transmitted.

Consequently, it might be considered that, originally, the mobile communication terminal 110b was not holding the summary information X, and that, only after it had received the SV (X) from the mobile communication terminal 110a, did it transmit the SV (X, Y). Alternatively, it might be considered that the mobile communication terminal 110b received the SV in advance from the mobile communication terminal 110a at a point when the two mobile communication terminals were able to communicate with each other. Accordingly, it can be deduced that the mobile communication terminal 110a also received the SV (X, Y) transmitted by the mobile communication terminal 110b, and that the mobile communication terminal 110a is holding the summary information X, Y. If no portions that are common to both SV exist in the SV reception histories, then it is determined that no SV has been received, and the deduced held information is not updated.

Here, it is not absolutely essential for the SV internal deduction results of other mobile communication terminals to have been deduced completely accurately. The internal deductions are intended to limit the sending in a single transmission of a large quantity of information having duplicated contents, and information that is wrongly identified with information already held by another mobile communication terminal can be exchanged during the occasion of the next periodic SV transmission.

Step S109, which is the processing of the internal deduction sections 134, is then ended, and, as is shown in FIG. 12, the mobile communication terminal 110c and the mobile communication terminal 110d update their own internal deduction results. After the SV of their own host terminals have been updated in the data storage sections 121 (FIG. 8: step S110), the mobile communication terminal 110c and the mobile communication terminal 110d finish their processing for the SV reception from the mobile communication terminal 110b.

Figure 13:
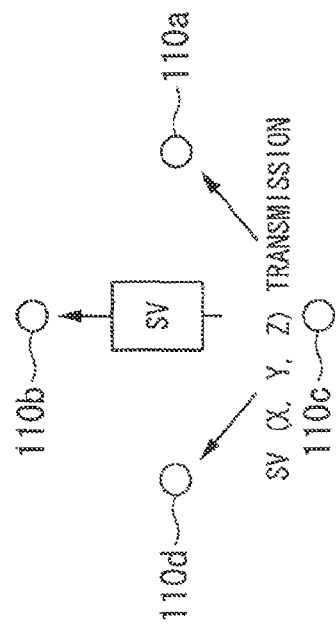
FIG. 13 is a view showing an actual operating example 4.

After the mobile communication terminal 110b has transmitted the SV, as is described above, the mobile communication terminal 110a, the mobile communication terminal 110c, and the mobile communication terminal 110d perform processing on the newly received SV. Next, as is shown in FIG. 11, the mobile communication terminal 110c, which has the earlier transmission timing out of the mobile communication terminal 110c and the mobile communication terminal 110d, ends step S105 in FIG. 8, and starts the processing of the next step S106 (FIG. 13).

In step S106, at the point in time when the SV of its own host terminal is to be transmitted, the duplication determination section 133 of the mobile communication terminal 110c reads an internal deduction 102 from the adjacent terminal management section 132, and compares the SV of the other mobile communication terminals with the SV of its own host terminal so as to verify any differences between them (FIG. 8: step S106).

As a result, the mobile communication terminal 110c ascertains that its own SV (X, Y, Z) holds the summary information Z that is not in the SV (X, Y) of the mobile communication terminal 110a and the mobile communication terminal 110b. Accordingly, the mobile communication terminal 110c determines that its own SV contains a greater quantity of summary information compared to the SV of the mobile communication terminal 110a and the mobile communication terminal 110b, and decides to transmit its own SV (X, Y, Z) in order to provide notification of this to the mobile communication terminal 110a and the mobile communication terminal 110b.

Next, the duplication determination section 133 sends notification of the SV transmission to the information exchange section 111, and the SV of the mobile communication terminal 110c is transmitted (FIG. 8: step S108).

At this time, the duplication determination section 133 notifies the exchange detection section 131 that the SV transmission is completed, and cancels the back-off period that was initially set, and also stops subsequent transfers of the SV to the adjacent terminal management section 132 and stops the calculation of the internal deduction results.

Next, because the mobile communication terminal 110a, the mobile communication terminal 110b, and the mobile communication terminal 110d that received the SV from the mobile communication terminal 110c have received a new SV from another mobile communication terminal, a determination is started in the exchange detection section 131 of each of these terminals as to whether or not it is necessary for them to transmit an SV (FIG. 8: steps S100 and S101).

The mobile communication terminal 110a, in the same way as when it received the SV from the mobile communication terminal 110b (described above), determines via its exchange detection section 131 that it is currently not in a back-off period (FIG. 8: step S100), and also compares the received SV with the SV of its own host terminal and, because there is no summary information that needs to be transmitted by its own host terminal (FIG. 8: step S101), sends the received SV to the data storage section 121, and updates the SV of its own host terminal. As is shown in FIG. 13, because the new summary information Z was received, the SV of the mobile communication terminal 110a becomes the SV (X, Y, Z).

The mobile communication terminal 110b, firstly, verifies via its exchange detection section 131 whether or not it is currently in a back-off period (FIG. 8: step S100). Because it has received notification from the duplication determination section 133 indicating that the SV transmission control has been completed, it determines that it is not in a back-off period, and the routine moves to the next step S101.

In step S101, although there is a difference between the received SV (X, Y, Z) and the SV of its own host terminal (X, Y), because its own host terminal is not holding any summary information which is not in the received SV, the exchange detection section 131 determines that it is not necessary for it to transmit an SV (FIG. 8: step S101), and the processing performed by the exchange detection section 131 is ended. The received SV is then sent to the data storage section 121, and the SV of its own host terminal is updated. As is shown in FIG. 13, because the new summary information Z has been received, the SV of the mobile communication terminal 110b is updated to the SV (X, Y, Z).

The mobile communication terminal 110d, firstly, verifies in its exchange detection section 131 whether or not it is currently in a back-off period (FIG. 8: step S100). Because it has sent notification for SV transmission control to the duplication determination section 133, but the exchange detection section 131 has not yet received a response indicating that this has ended, it determines that it is currently in a back-off period, and the routine moves to step S109 in FIG. 8.

In step S109, the exchange detection section 131 sends the received SV to its data storage section 121 and adjacent terminal management section 132, and in the same way as when it received the SV from the mobile communication terminal 110b, the adjacent terminal management section 132 updates its SV reception history, and then, as is shown in FIG. 13, updates the internal deduction results for the SV of the other mobile communication terminals using its internal deduction section 134 (FIG. 8: step S109), and, as is shown in FIG. 13, updates the SV of its own host terminal (FIG. 8: step S110).

Here, in the same way as for the calculation methods described above, in the calculations of the internal deductions (FIG. 8: step S109), by discovering common portions in the summary information within the SV from the SV reception history, the reception situation of the other mobile communication terminals is deduced. Because the mobile communication terminal 110d ascertains from the reception history shown in FIG. 13 that the summary information SV (X) and the summary information SV (X, Y) received from the mobile communication terminal 110a and the mobile communication terminal 110b are contained within the summary information SV (X, Y, Z) received from the mobile communication terminal 110c, it determines that the mobile communication terminal 110c, the mobile communication terminal 110a, and the mobile communication terminal 110b are in positions where they are able to communicate with each other. In addition, the mobile communication terminal 110d determines that the contents transmitted by the mobile communicate terminal 110c are being received by the mobile communication terminal 110a and the mobile communication terminal 110b and, as is shown in FIG. 13, the internal deduction results for the SV held by the mobile communication terminal 110a, the mobile communication terminal 110b, and the mobile communication terminal 110c are updated to the SV (X, Y, Z)

After the mobile communication terminal 110c has transmitted the SV, as is described above, the mobile communication terminal 110a, the mobile communication terminal 110b, and the mobile communication terminal 110d perform processing on the newly received SV. Next, as is shown in FIG. 11, the mobile communication terminal 110d, which is the last terminal to transmit an SV, ends step S105 in FIG. 8, and starts the processing of the next step S106 (FIG. 14).

In step S106, at the point in time when the SV of its own host terminal is to be transmitted, the duplication determination section 133 reads from the adjacent terminal management section 132 an internal deduction result that shows the SV of the other mobile communication terminals at the current point in time, and makes a comparison in order to ascertain whether there are any differences between these and the current SV of its own host terminal, and then determines whether or not it should transmit an SV (FIG. 8: step S107).

Figure 14:
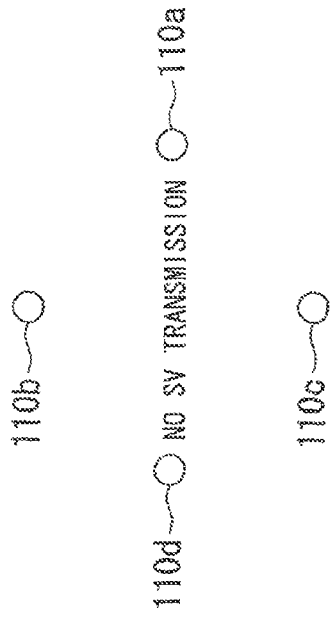
FIG. 14 is a view showing an actual operating example 5.

As a result, as is shown in FIG. 14, the duplication determination section 133 ascertains that the SV (X, Y, Z) of the mobile communication terminal 110d matches the SV (X, Y, Z) of all of the other mobile communication terminals 110a through 110c in the internal deduction, and that there is no summary information needing to be sent by its own host terminal. The duplication determination section 133 of the mobile communication terminal 110d then determines that it is not necessary for it to transmit an SV, and ends its own SV transmission control.

At this time, the duplication determination section 133 notifies the exchange detection section 131 that the SV transmission is completed, and cancels the back-off period that was initially set, and also stops subsequent transfers of the SV to the adjacent terminal management section 132 and stops the calculation of the internal deduction results.

When the SV transmissions by the mobile communication terminals 110a through 110d have ended, as is shown in FIG. 14, the synchronizing of the summary information between the mobile communication terminals 110a through 110d is completed, and all of the mobile communication terminals 110 are holding the SV (X, Y, Z). Thereafter, the mobile communication terminals employ periodic SV transmissions to monitor whether their summary information is synchronized with that of the other mobile communication terminals, and if a difference in the SV is generated between themselves and another mobile communication terminal, the above-described synchronization processing is executed once again.

If the internal deduction to deduce the SV of another mobile communication terminal is not carried out accurately, and summary information exists that cannot be shared with other mobile communication terminals in a single summary information synchronization processing operation, then the missing portion of the summary information is supplemented at the time of the next periodic SV exchange.

After the SV transmissions have been completed, if the Epidemic method is being used, each mobile communication terminal starts to make reception requests for contents that it lacks based on the SV, and starts the synchronizing of the contents information. If position information is used in the SV, then the synchronizing of the information is completed at the same time as the transmitting of the SV is completed.

By employing the above-described method it is possible to reduce transmissions of SV that are duplicated between mobile communication terminals 110. Consequently, it is possible to solve the problem points in the existing technology that occur in situations of a high terminal density, or when one terminal is holding similar information to the other terminals.

In the present embodiment, a description has been given of when the network which is formed by the terminals is a wireless network, however, the present invention may also be used in other networks in which information is transmitted to all of the terminals within a communicable range, in the same way as in a wireless network. For example, in an interconnected wire network, the present invention may be used for information sharing within a broadcast domain (or a collision domain).

Figure 15:
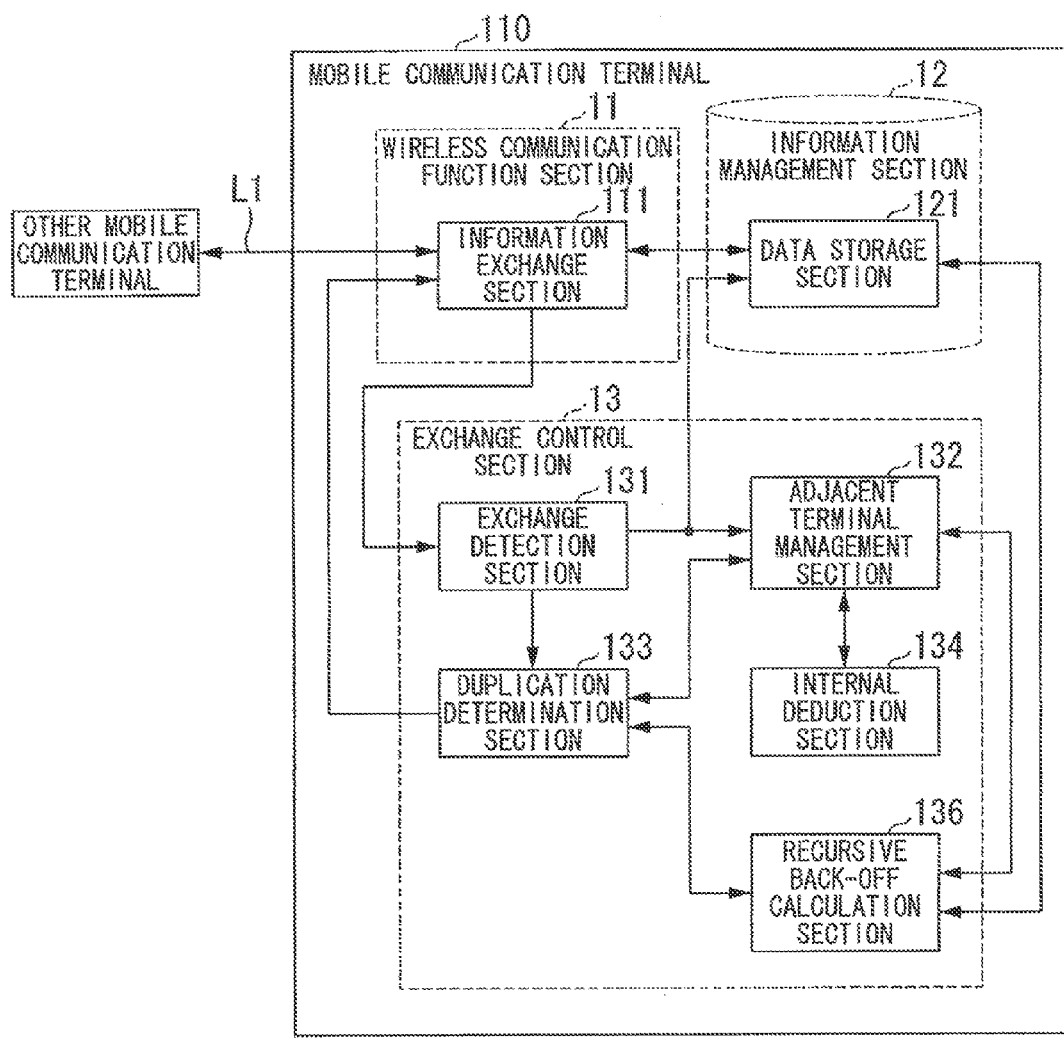
FIG. 15 is a view showing the structure of a second embodiment.

FIG. 15 shows the structure of a second embodiment. In the first embodiment a system was described in which a terminal only set a back-off period once when transmitting its own SV. In contrast to this, in the second embodiment, a back-off period is set once again at the initially set SV transmission timing, and the back-off period is calculated based on a degree of similarity that shows the proportion of elements in the information held by a particular terminal that are in common with the SV of the other mobile communication terminals. Specifically, the second embodiment differs from the first embodiment in that, instead of the back-off calculation section 135 of the exchange control section 13 of the first embodiment which was shown in FIG. 3, the exchange control section 13 has a recursive back-off calculation section 136.

The duplication determination section 133 has the same functions as in the first embodiment, however, in the present embodiment, it may also make a new determination as to whether or not an SV transmission should be made (described below). The duplication determination section 133 makes the decision of whether or not to transmit an SV on the affirmative side if, when the degree of similarity between the SV to be transmitted by a particular terminal and the SV of all of the other mobile communication terminals in the internal deduction results is calculated, the average thereof is equal to or less than a threshold value. If it is more than the threshold value, then it is determined by that particular terminal that all of the other mobile communication terminals are already holding the same SV as itself, and that terminal may discontinue the transmission of its own SV.

The calculation of the degree of similarity may be made based on how many items of summary information are contained in common within all the SV. For example, if the SV is taken as one set, and the summary information within the SV of a terminal taken as one element within that set so as to form the sets (SVa and SVb), it is possible to use a degree of similarity that is calculated by dividing the number of common elements in the set SVa and the set SVb by the total number of elements in at least one of these sets (i.e., Jaccard's coefficient).

[Formula 2]

$$j=|SV_a \cap SV_b|/|SV_a \cup SV_b| \quad \text{Jaccard's coefficient}$$

Moreover, instead of discontinuing the transmission, it is also possible to decide the SV transmission timing by providing a repeat back-off period using the recursive back-off calculation section 136. By doing this, it is possible to give priority to the transmissions of SV from terminals that have a greater number of differences in their summary information from among the mobile communication terminals 110, and, in one transmission, to make up for the large number of differences in the summary information between the mobile communication terminals 110.

The recursive back-off calculation section 136 has the functions of reading the SV of its own host terminal from the data storage section 121, and the internal deduction results for the SV of the other mobile communication terminals from the adjacent terminal management section 132, and of calculating a back-off period based on the SV of its own host terminal and the SV of the other mobile communication terminals. If a transmission is to be made immediately, it sends notification to the duplication determination section 133 that there is to be no back-off period.

The calculation of the back-off period that is based on SV is made based on the correlation between the SV held by its own host terminal and the received SV. For example, the calculation may be a simple one as is shown by Formula (3).

[Formula 3]

$$\text{back-off period}=\text{random numerical value}*(\beta+ \gamma*\text{correlation of holding information})*\text{slot} \quad (3)$$

slot: transmission interval, $\beta$, $\gamma$: correction coefficient

The correlation between the held information may also be determined using Jaccard's coefficient in the same way as the above-described calculation of the degree of similarity.

Formula (3) makes it possible to adjust the time distribution acquired by a terminal using the settings of the correction coefficient.

If the transmission time is to be brought forward, the value of $\beta$ is decreased, while if the transmission time is to be delayed, the value of $\beta$ is increased.

If the effects of the correlation of the held information on one side are to be strengthened, the value of $\gamma$ may be increased, while if the effects are to be weakened, the value of $\gamma$ may be decreased. By setting the back-off period based on correlations between held information, it is possible to transmit SV from terminals having the most differences in their summary information, and it is possible in one transmission to make up for the large number of differences in the summary information.

Moreover, it is also possible to make the calculation without using Formula (3), and to instead provide a threshold value for the correlation value derived using Jaccard's coefficient, and when this threshold value is exceeded to make the calculation using the back-off period calculation Formulas (1) and (2) that were used in the first embodiment.

Figure 16:
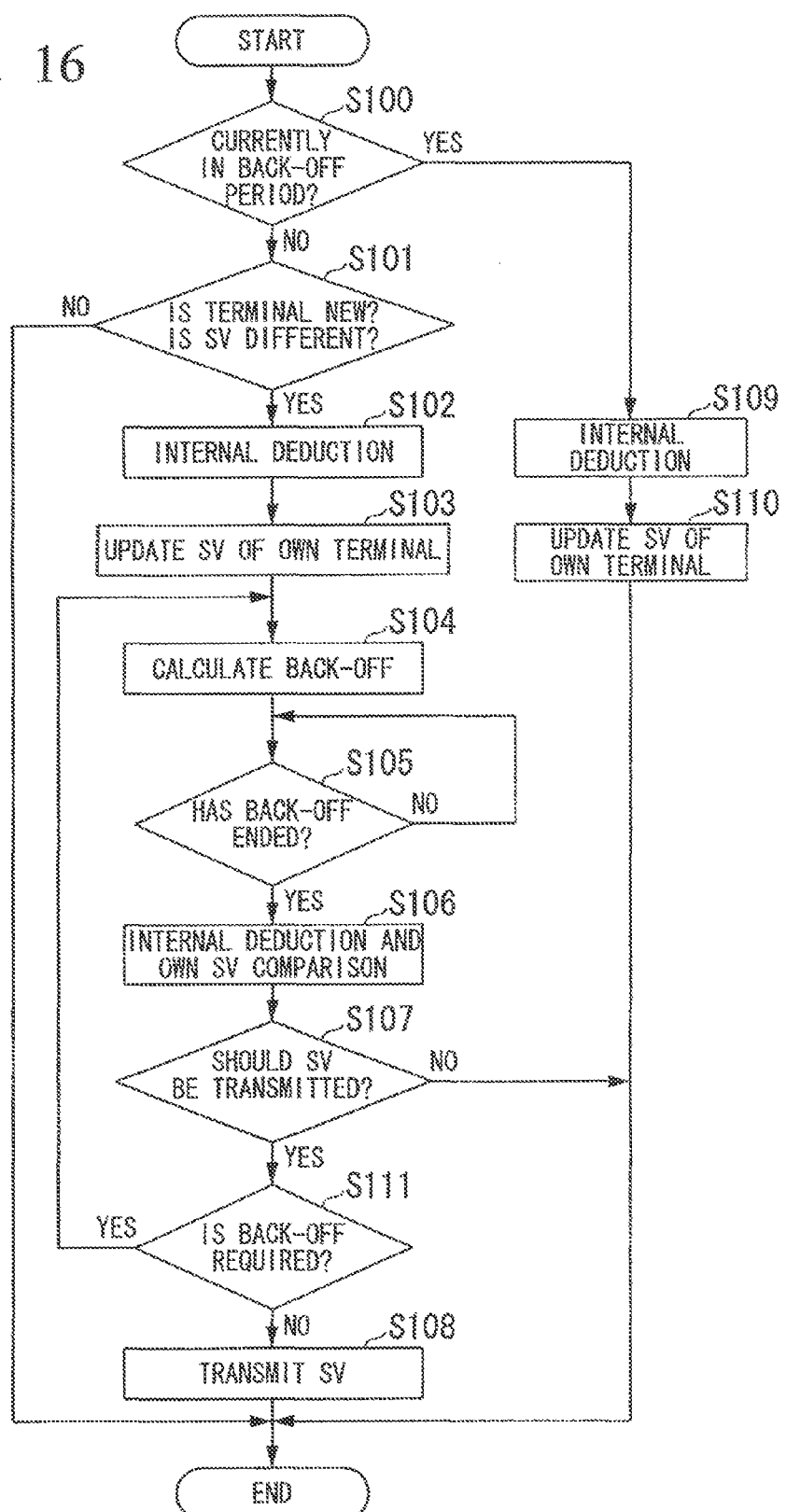
FIG. 16 is a view showing an operational flowchart of the second embodiment.
Figure 17:
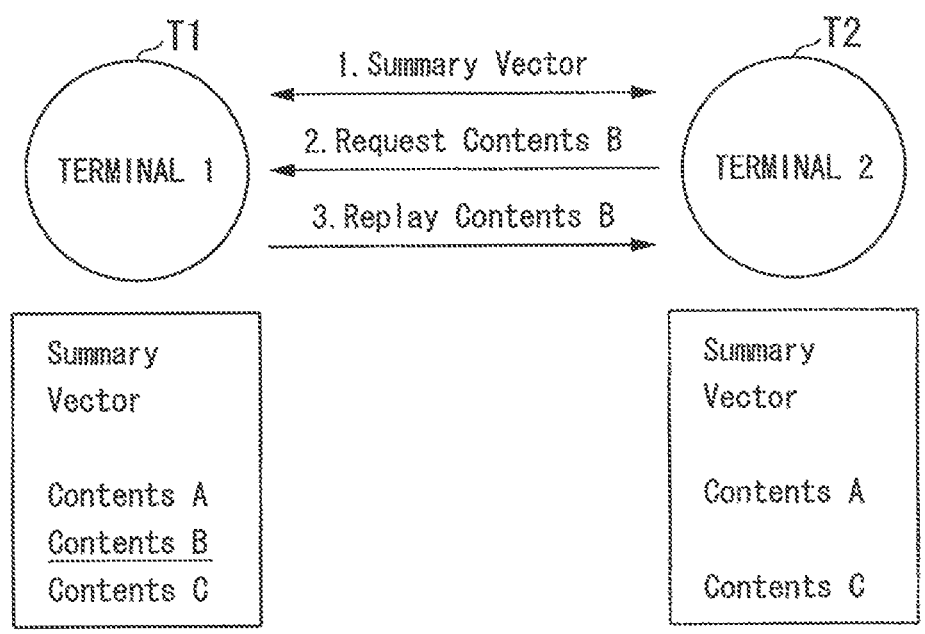
FIG. 17 is a view showing an outline of the conventional technology.
Figure 18A:
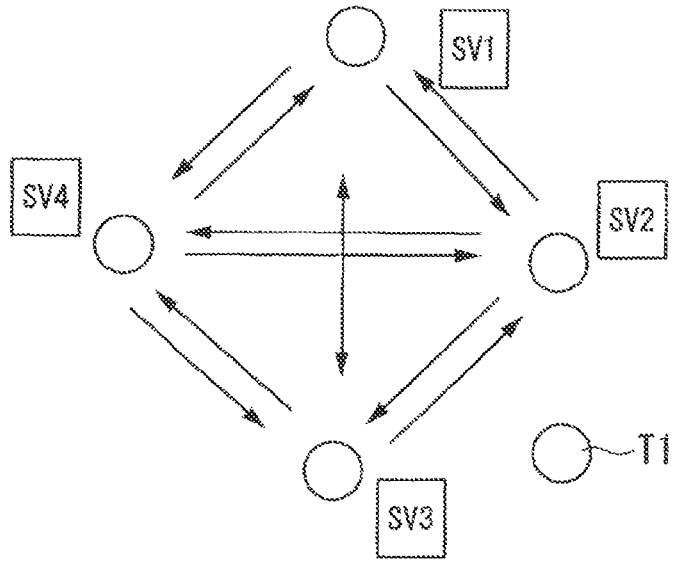
FIG. 18A is a view showing the conventional technology.
Figure 18B:
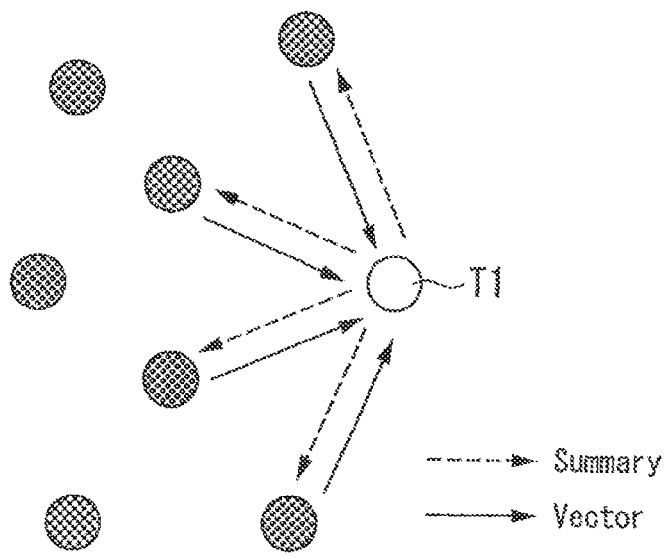
FIG. 18B is a view showing the conventional technology.

FIG. 16 shows an operational flowchart of the second embodiment. The second embodiment is characterized in that processing for a step S111 is added between step S107 and step S108 of the first embodiment. The processing performed by the exchange detection section 131, the adjacent terminal management section 132, the duplication determination section 133, and the internal deduction section 134, which are described in steps S100 through S103 and steps S105 through S110, are the same as the operations performed by the respective function sections 131 through 134 of the first embodiment, and, therefore, any description thereof is omitted here.

Only those points of difference when the recursive back-off calculation section 136 of the present embodiment performs the processing of steps S104 and S111 will be described using the flow starting from the situation shown in FIG. 9, which was described in the first embodiment, up until the point when synchronization of the SV has been completed.

Firstly, the mobile communication terminal 110a transmits its own SV as a periodic SV transmission. The mobile communication terminal 110b, the mobile communication terminal 110c, and the mobile communication terminal 11d which receive the SV from the mobile communication terminal 110a perform the processing of steps S100 through S103 shown in FIG. 16, and in the next step S104, they calculate the back-off period using their recursive back-off calculation section 136.

In step S104, the recursive back-off calculation section 136 reads the SV of its own host terminal from the data storage section 121, and the internal deduction results from the adjacent terminal management section 132. It then calculates an SV transmission timing based on Formula (3), and sends notification of this to the duplication determination section 133.

As a result of this back-off period being calculated, in the same way as in the first embodiment, the SV transmission sequence is decided in the manner shown in FIG. 11, with the transmission sequence being set as, firstly, the mobile communication terminal 110b, then the mobile communication terminal 110c, and then the mobile communication terminal 110d.

After the mobile communication terminal 110a has transmitted the SV, as is shown in FIG. 11, the mobile communication terminal 110b, which has the earliest transmission timing from among the mobile communication terminal 110b, the mobile communication terminal 110c, and the mobile communication terminal 110d, is the next to start transmitting its SV.

When the mobile communication terminal 110b has finished the steps S105 and S106 shown in FIG. 16, because it is holding summary information that is not held by the mobile communication terminal 110a, it decides in step S107 to transmit its own SV (X, Y). The routine then moves to the processing of step S111.

In step S111, the duplication detection section 133 of the mobile communication terminal 110b has already made the decision to transmit the SV of its own host terminal, however, it now determines whether or not to set a repeat back-off period.

In the resetting of the back-off period (FIG. 16: step S111), a comparison is made by determining the internal deductions of the SV of the other mobile communication terminals and the average of the Jaccard's coefficient of the SV of its own host terminal. If the average value is low (i.e., if there are many differences in the held information, a similarity of less than 80%), then transmission takes place immediately, while if the average value is high (i.e., if there are few differences, a similarity of 80% or more), transmission does not take place immediately and a back-off period is once again provided, and communication opportunities are allocated to the other mobile communication terminals.

In this manner, the reason for setting a repeat back-off period is because, even if a particular terminal initially has a large number of summary information differences compared to the other mobile communication terminals, there are cases in which terminals that have already transmitted their SV ahead of that particular terminal have already transmitted the same summary information.

When a particular terminal is transmitting its SV, if the differences in the summary information compared to the other mobile communication terminals have decreased, then by providing a repeat back-off period, it is possible to present a communication opportunity to the next terminal having a large number of differences in the summary information that is due to transmit. As a result, it is possible using only a small number of transmissions to make up for a large number of differences in the summary information between a particular terminal and the terminals around it.

Thereafter, the processing is continued in the same way as in the first embodiment, and when the mobile communication terminal 110c and the mobile communication terminal 110d perform their transmissions, they synchronize SV while making the determination about the resetting of the back-off period.

Moreover, as was described in the first embodiment, each time a new SV is received, the determination as to whether or not the terminal should transmits its own SV, as well as the resetting of the back-off period may be performed. By resetting the back-off period each time an SV is received, it is possible to dynamically adjust the transmission timings such that the terminal having the greatest number of differences in the summary information at that point in time compared to the other mobile communication terminals is able to transmit its SV first.

As a result of the above, in the present embodiment, because back-off periods are set based on differences in the held information between the mobile communication terminals 110, it is possible to give priority to the transmission of the SV from the terminal that has the greatest number of differences in its summary information compared to the other mobile communication terminals. As a result, compared to the first embodiment, it is possible using only a small number of transmissions to make up for a large number of differences in the summary information.

In the present embodiment, a description has been given of when the network which is formed by the multiple mobile communication terminals 110 is a wireless network, however, the present invention may also be used in other networks in which information is transmitted to all of the terminals within a communicable range, in the same way as in a wireless network. For example, in an interconnected wire network, the present invention may be used for information sharing within a broadcast domain (or a collision domain).

Figure 19:
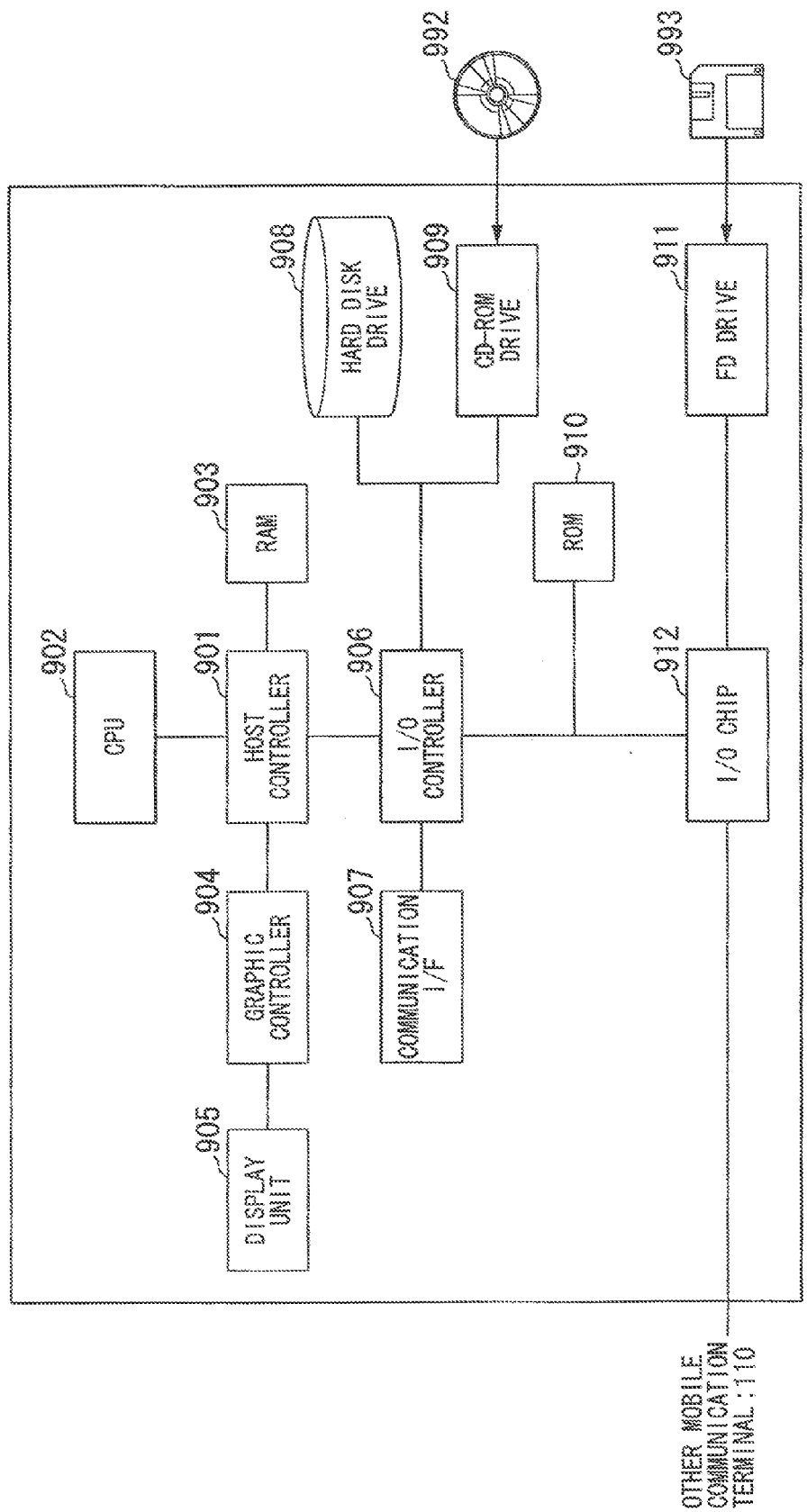
FIG. 19 is a view showing an example of the hardware structure of a mobile communication terminal 110.

FIG. 19 shows an example of the hardware structure when the mobile communication terminal 110 is formed by an electronic information processing device such as a computer or the like. The mobile communication terminal 110 is provided with a CPU (Central Processing Unit) peripheral portion, an input/output portion, and a legacy input/output portion. The CPU peripheral portion has a CPU 902, RAM (random Access Memory) 903, a graphic controller 904, and a display unit 905 that are mutually connected together via a host controller 901. The input/output portion has a communication interface 907, a hard disk drive 908, and a CD-ROM (Compact Disk Read Only Memory) drive 909 that are connected to the host controller 901 via an input/output controller 906. The legacy input/output portion has ROM (Read Only Memory) 910, a flexible disk drive 911, and an input/output chip 912 that are connected to the input/output controller 906.

The host controller 901 connects together the RAM 903, the CPU 902 that accesses the RAM 903 at a high transmission rate, and the graphic controller 904. The CPU 902 operates based on programs stored in the ROM 910 and the RAM 903 so as to control the various portions. The graphic controller 904 acquires image data created by the CPU 902 and the like on a frame buffer provided in the RAM 903, and displays this image data on the display unit 905. Instead of this, it is also possible for the graphic controller 904 to internally include a frame buffer for storing image data created by the CPU 902 and the like.

The input/output controller 906 connects together the host controller 901, the hard disk drive 908, which is a comparatively high-speed input/output device, the communication interface 907, and the CD-ROM drive 909. The hard disk drive 908 stores programs and data used by the CPU 902. The communication interface 907 connects with other mobile communication terminals 110 and exchanges programs and data. The CD-ROM drive 909 reads programs and data from a CD-ROM 992, and then supplies them via the RAM 903 to the hard disk drive 908 and the communication interface 907.

The ROM 910, the flexible disk drive 911, and the input/output chip 912, which is a comparatively low-speed input/output device, are connected to the input/output controller 906. The ROM 910 stores boot programs that are executed by the mobile communication terminal 110 when it is activated, and programs and the like that depend on the hardware of the mobile communication device 110. The flexible disk drive 911 reads programs and data from a flexible disk 993, and then supplies them via the RAM 903 to the hard disk drive 908 and the communication interface 907. The input/output chip 912 is used to connect the flexible disk drive 911, or to connect various types of input/output devices via a parallel port, a serial port, a keyboard port, a mouse port, or the like.

The programs executed by the CPU 902 are stored on a recording medium such as the flexible disk 993, the CD-ROM 992, or an IC card or the like, and are supplied by a user. The programs stored on the recording medium may be either compressed or uncompressed. The programs are installed from the recording medium onto the hard disk drive 908, and are then read in the RAM 903 and executed by the CPU 902. The programs executed by the CPU 902 are made to function as the wireless communication function section 11, the information management section 12, the exchange control section 13, the information exchange section 111, the data storage section 121, the exchange detection section 131, the adjacent terminal management section 132, the duplication determination section 133, the internal deduction section 134, the back-off calculation section 135, and the recursive back-off calculation section 136 that were described above in association with FIG. 1 through FIG. 16.

The aforementioned programs may also be stored on an external recording medium. As the recording medium it is possible to use, in addition to the flexible disk 993 and the DC-ROM 992, an optical recording medium such as a DVD (Digital Versatile Disk) or a PD (Phase Disk), a magneto-optical recording medium such as an MD (Mini Disk), a tape medium, or semiconductor memory such as an IC card or the like. It is also possible to use as the recording medium a storage medium such as a hard disk or RAM that is provided in a server system that is connected to a dedicated communication network or to the Internet, and to supply the information sharing system 100 via this network as a program.

The respective embodiments of the present invention have been described and illustrated above, however, the range of technology of the present invention is in no way limited to the range described in these embodiments. It is to be understood that it is evident to one skilled in the art that various modifications and improvements may be added to the above-described embodiments. Embodiments created by such modifications and improvements are also to be included in the range of technology of the present invention.

INDUSTRIAL APPLICABILITY

The above-described embodiments can be applied, for example, to an information sharing system that shares information contents over an ad hoc network between multiple mobile communication terminals.

DESCRIPTION OF THE REFERENCE NUMERALS

100 Information sharing system
110 Mobile communication terminal
L1 Wireless communication
11 Wireless communication function section
111 Information exchange section
12 Information management section
121 Data storage section
13 Exchange control section
131 Exchange detection section
132 Adjacent terminal management section
133 Duplication determination section
134 Internal deduction section
135 Back-off calculation section
136 Recursive back-off calculation section
901 Host controller
902 CPU
903 RAM
904 Graphic controller
905 Display unit
906 Input/output controller
907 Communication interface
908 Hard disk drive
909 CD-ROM drive
910 ROM
911 Flexible disk drive
912 Input/output chip
992 CD-ROM
993 Flexible disk

The invention claimed is:

1. An information sharing system in which information is shared between communication devices that form an ad hoc network, comprising:
   a plurality of communication devices that wirelessly transmit notification messages that comprise a first summary vector identifying content held by the transmitting communication device with other communication devices without going through an access point, wherein
   each communication device comprises:
   an internal deduction portion that, based on a reception history comprising a log of notification messages received in additional summary vectors from each of the other communication devices, deduces which information has been notified to neighboring communication devices based on the reception history of at least two communication devices including the neighboring communication devices;
   a duplication determination portion that determines whether or not the information deduced by the internal deduction portion and that has been notified by said other communication devices matches information held by an own communication device; and
   an information exchange portion that, based on a determination that the information does not match, transmits a notification message that contains the information currently held by said own communication device that is different from the information that has been notified by said other communication devices deduced by the internal deduction portion.

2. The information sharing system according to claim 1, wherein the communication devices hold information comprising one or more constitutional elements.

3. The information sharing system according to claim 1, wherein the internal deduction portion generates a reception history of notification messages from the neighboring communication devices during a back-off period, deduces which information has been notified to said neighboring communication devices by using the reception history after the back-off period.

4. The information sharing system according to claim 1, wherein, after the internal deduction portion decides to transmit a notification message from said own communication device as a result of receiving a notification message and until deducing which information which has been notified to said neighboring communication devices, the internal deduction portion deduces which information has been notified to said neighboring communication devices using the reception history of the notification messages received from said other communication devices.

5. The information sharing system according to claim 1, wherein, when deducing the held information, the internal deduction portion determines that all of said other communication devices have received all information within the reception histories of the notification messages and registers the information within the reception histories in the information which has been notified to said neighboring communication devices to be deduced.

6. The information sharing system according to claim 1, wherein, when deducing the notified information, the internal deduction portion determines that two or more communication devices that have transmitted notification messages within the reception histories sharing common elements are in a relationship that allows them to communicate with each other, and registers all information described in the notification messages containing the common elements in the information has been notified to the communication device that transmitted the notification message containing the common elements.

7. The information sharing system according to claim 1, wherein, upon deducing the notified information, when a difference between a most recent notification message received from a transmission communication device of notification messages and information included in a previous notification message received from the transmission communication device is contained within a notification message from other transmission communication device of a notification message received between the most recent notification message and the previously received notification message, the internal deduction portion determines that the transmission communication device and said other transmission communication device are within a range that allows them to communicate with each other, and registers all information described in both the notification messages of the transmission communication device and the notification messages of said other transmission communication device in the information has been notified to the transmission communication device and said other transmission communication device.

8. The information sharing system according to claim 1, wherein, upon determining whether or not the notified information matches, the duplication determination portion conducts a transmission operation when one or more of said other communication devices which are deduced and which have notified information excluding all of information held by said own communication device.

9. The information sharing system according to claim 1, wherein, upon determining whether or not the notified information matches, the duplication determination portion conducts a transmission operation when said other communication devices which are more than a threshold and which are deduced and which have notified information excluding all of information held by said own communication device.

10. The information sharing system according to claim 1, wherein the duplication determination portion makes the determination whether or not the notified information matches each time the notification message is received.

11. The information sharing system according to claim 1, wherein, upon determining whether or not the notified information matches, the duplication determination portion calculates a proportion of common elements between the information which has been notified by the other communication devices which are deduced and information held by said own communication device, and provides a transmission waiting period when an average of calculation results of the proportion is greater than a threshold.

12. The information sharing system according to claim 11, wherein the duplication determination portion sets the waiting period for the transmitting of the notification message, and makes the determination whether or not the notified information matches after the waiting period.

13. The information sharing system according to claim 11, wherein the duplication determination portion randomly calculates the waiting period.

14. The information sharing system according to claim 11, wherein the faster said own communication device moves, the shorter the waiting period is calculated by the duplication determination portion.

15. The information sharing system according to claim 11, wherein the duplication determination portion calculates a degree of similarity that shows the proportion of elements that are common to both the information held by said own communication device and notified information described in received notification messages, and calculates a longer transmission waiting period as the degree of similarity becomes higher.

16. The information sharing system according to claim 1, wherein the information comprises summary vectors, contents acquisition requests and responses, contents information, or position information for other mobile communication terminals.

17. The information sharing system according to claim 16, wherein the summary vectors are transmitted at periodic intervals.

18. A communication device that wirelessly transmits notification messages that comprise a first summary vector identifying content held by the communication device with other communication devices to communicate with them without going through an access point, comprising:
    an internal deduction portion that, based on a reception history comprising a log of notification messages received in additional summary vectors from each of the other communication devices, deduces which information has been notified to neighboring communication devices based on the reception history of at least two communication devices including the neighboring communication devices;
    a duplication determination portion that determines whether or not the information that has been notified by said other communication device deduced by the internal deduction portion matches information held by an own communication device; and
    an information exchange portion that, based on a determination that the information does not match, transmits a notification message that contains the information currently held by said own communication device that is different from the information that has been notified by said other communication devices deduced by the internal deduction portion.

19. A control method for controlling a communication device that wirelessly transmits notification messages that comprise a first summary vector identifying content held by the communication device with other communication devices to communicate with them without going through an access point, comprising:

an internal deduction step of, based on a reception history comprising a log of notification messages received in additional summary vectors from each of said other communication devices, deducing which information has been notified to neighboring communication devices based on the reception history of at least two communication devices including the neighboring communication devices;

a duplication determination step of determining whether or not the information that has been notified by other communication device deduced by the internal deduction portion matches information held by an own communication device; and an information exchange step of, based on a determination that the information does not match, transmitting a notification message containing the information currently held by said own communication device that is different from the information that has been notified by said other communication devices deduced by the internal deduction step.

20. A computer program that is stored on a computer-readable non-transitory recording medium of a communication device that wirelessly transmits notification messages that comprise a first summary vector identifying content held by the communication device with other communication devices to communicate with them without going through an access point, comprising:

an internal deduction instruction for, based on a reception history comprising a log of notification messages received in additional summary vectors from each of said other communication devices, deducing which information has been notified to neighboring communication devices based on the reception history of at least two communication devices including the neighboring communication devices;

a duplication determination instruction for determining whether or not the information that has been notified by other communication device deduced by the internal deduction portion matches information held by an own communication device; and an information exchange instruction, based on a determination that the information does not match, for transmitting a notification message containing the information currently held by said own communication device that is different from the information that has been notified by said other communication devices deduced by the internal deduction instruction.

* * * * *